Oct. 4, 1960 W. WOODS-HILL 2,954,927
ELECTRONIC CALCULATING APPARATUS
Filed May 6, 1954 13 Sheets-Sheet 1

INVENTOR
WILLIAM WOODS-HILL
BY [signature]
ATTORNEY

Oct. 4, 1960 W. WOODS-HILL 2,954,927
ELECTRONIC CALCULATING APPARATUS
Filed May 6, 1954 13 Sheets-Sheet 6

INVENTOR
WILLIAM WOODS-HILL
BY
ATTORNEY

INVENTOR
WILLIAM WOODS-HILL
BY
ATTORNEY

Oct. 4, 1960    W. WOODS-HILL    2,954,927
ELECTRONIC CALCULATING APPARATUS
Filed May 6, 1954    13 Sheets-Sheet 8

INVENTOR
WILLIAM WOODS-HILL
BY
ATTORNEY

Oct. 4, 1960 W. WOODS-HILL 2,954,927
ELECTRONIC CALCULATING APPARATUS
Filed May 6, 1954 13 Sheets-Sheet 9

INVENTOR
WILLIAM WOODS-HILL
BY Fredrick E. Hane
ATTORNEY

Oct. 4, 1960 W. WOODS-HILL 2,954,927
ELECTRONIC CALCULATING APPARATUS
Filed May 6, 1954 13 Sheets-Sheet 10

INVENTOR
WILLIAM WOODS-HILL
BY
ATTORNEY

Oct. 4, 1960 W. WOODS-HILL 2,954,927
ELECTRONIC CALCULATING APPARATUS
Filed May 6, 1954 13 Sheets-Sheet 11

INVENTOR
WILLIAM WOODS-HILL
BY Fredrick E. Haine
ATTORNEY

Oct. 4, 1960    W. WOODS-HILL    2,954,927
ELECTRONIC CALCULATING APPARATUS
Filed May 6, 1954    13 Sheets-Sheet 12

INVENTOR
WILLIAM WOODS-HILL
BY Frederick E. Haug
ATTORNEY

Oct. 4, 1960  W. WOODS-HILL  2,954,927
ELECTRONIC CALCULATING APPARATUS
Filed May 6, 1954  13 Sheets-Sheet 13

INVENTOR
WILLIAM WOODS-HILL
BY
ATTORNEY

United States Patent Office 2,954,927
Patented Oct. 4, 1960

2,954,927

ELECTRONIC CALCULATING APPARATUS

William Woods-Hill, Letchworth, England, assignor to International Computers and Tabulators Limited, London, England Filed May 6, 1954, Ser. No. 427,907

Claims priority, application Great Britain May 29, 1953

15 Claims. (Cl. 235—159)

This invention relates to electronic calculating apparatus.

It has already been proposed, in British patent specification No. 674,952, to employ the principle of successively halving the multiplier and doubling the multiplicand, in the electronic multiplying machine. This system is particularly advantageous when one of the factors is expressed in a non-uniform notation, such as sterling. The machine described in the above mentioned specification operates in the parallel mode; that is, each operation is performed simultaneously on all the denominations of a number. The parallel mode allows multiplication to be performed relatively rapidly, but it entails the use of a considerable amount of equipment.

It is the object of the present invention to provide a simplified form of electronic multiplier, operating on the successive halving and doubling principle, in which successive denominations of a number are operated upon in time sequence.

According to the invention, an electronic multiplying apparatus has means for storing a multiplier value, a multiplicand value and a product value, means for simultaneously halving the stored multiplier value and doubling the stored multiplicand value, means for replacing the stored multiplier and multiplicand values by the halved and doubled values respectively, means for detecting when the stored multiplier value is odd, means for adding two values, denomination by denomination, means under control of said detecting means for entering the stored multiplicand and product values into the adding means to form a new product value, means for replacing the stored product value by the new product value and control means for effecting repeated halving, doubling and adding cycles, at least until the multiplier value is reduced to zero.

The invention will now be described by way of example, with reference to the accompanying drawings, in which:

Figures 1 and 2 taken together comprise a block diagram of the arithmetic unit of the machine;

Figures 3, 4, 5 and 6 taken together comprise a block diagram of the control unit of the machine;

1. General

The electronic calculator is adapted to use a punched card machine for input and output of data. This machine is similar to that shown and described in British patent specification No. 673,759.

The electrical sensing of a punched card results in a single impulse being generated for each denomination of a number to be entered, the timing of the impulse within the sensing cycle being indicative of the digital value. Numbers are represented within the arithmetic unit of the calculator in a combinational code, using the values 1, 2, 4 and 8. Accordingly, each timed impulse is converted to the equivalent coded form before transfer into the arithmetic unit.

Throughout the arithmetic unit of the machine, the four possible code values in a denomination are operated upon simultaneously, but the denominations are operated upon in sequence, commencing with the least significant.

The arithmetic unit provides facilities for the multiplication, addition and subtraction of decimal values, and of values expressed in non-uniform notations, such as sterling, or Indian currency. In addition the multiplicand value may be column shifted, that is, it may be divided by ten, one or more times. The timing of operations within the arithmetic unit is effected by a control unit, dependent upon a source of master clock pulses. The control unit also provides programming facilities, so that a multiplication may be followed by an addition, for example, and a programme may be modified dependent upon the result of calculations carried out on previous programme steps or upon the sensing of a special designation hole on a card.

2. Arithmetic unit—general

The method of performing various arithmetic operations, and the input and output of data will be considered in relation to a block diagram (Figures 1 and 2) of the arithmetic unit. The detailed operation of the various functional units will be described at a later stage.

Figure 1:
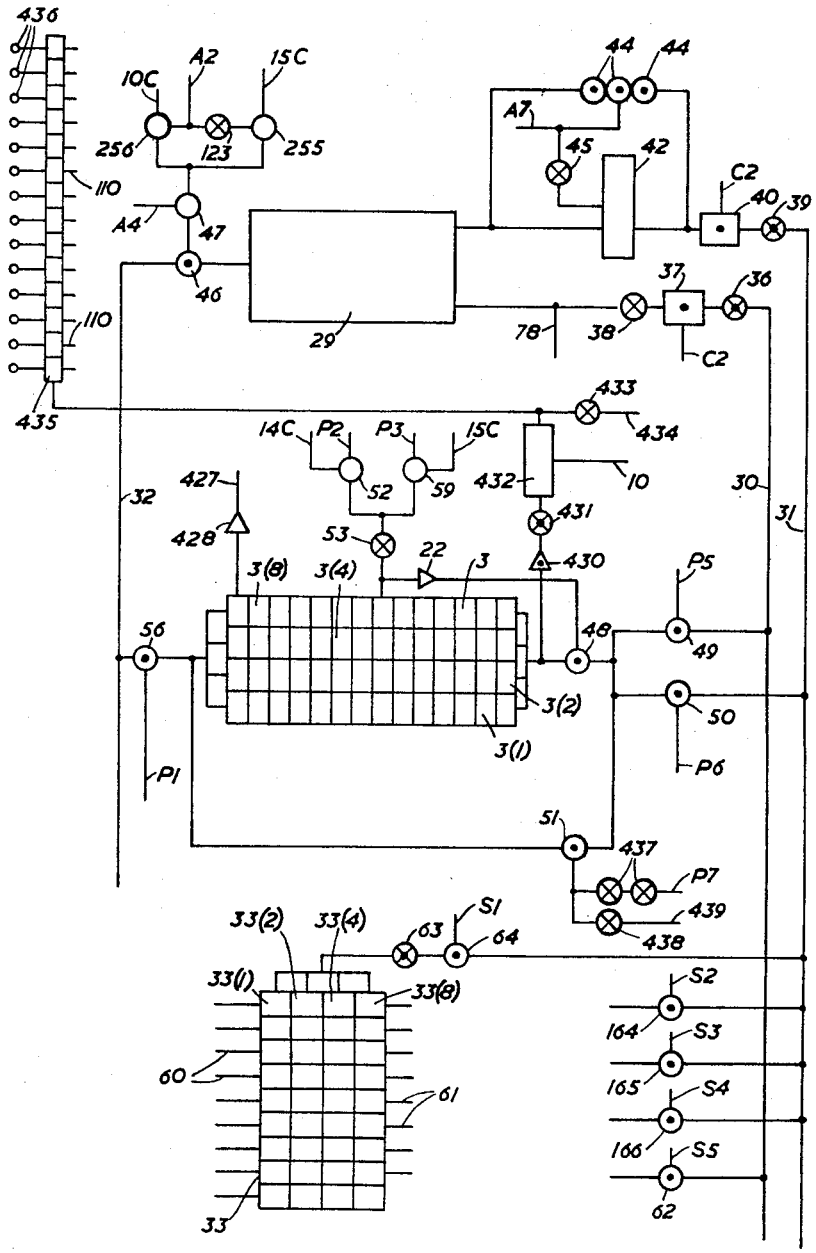
Figure 2:
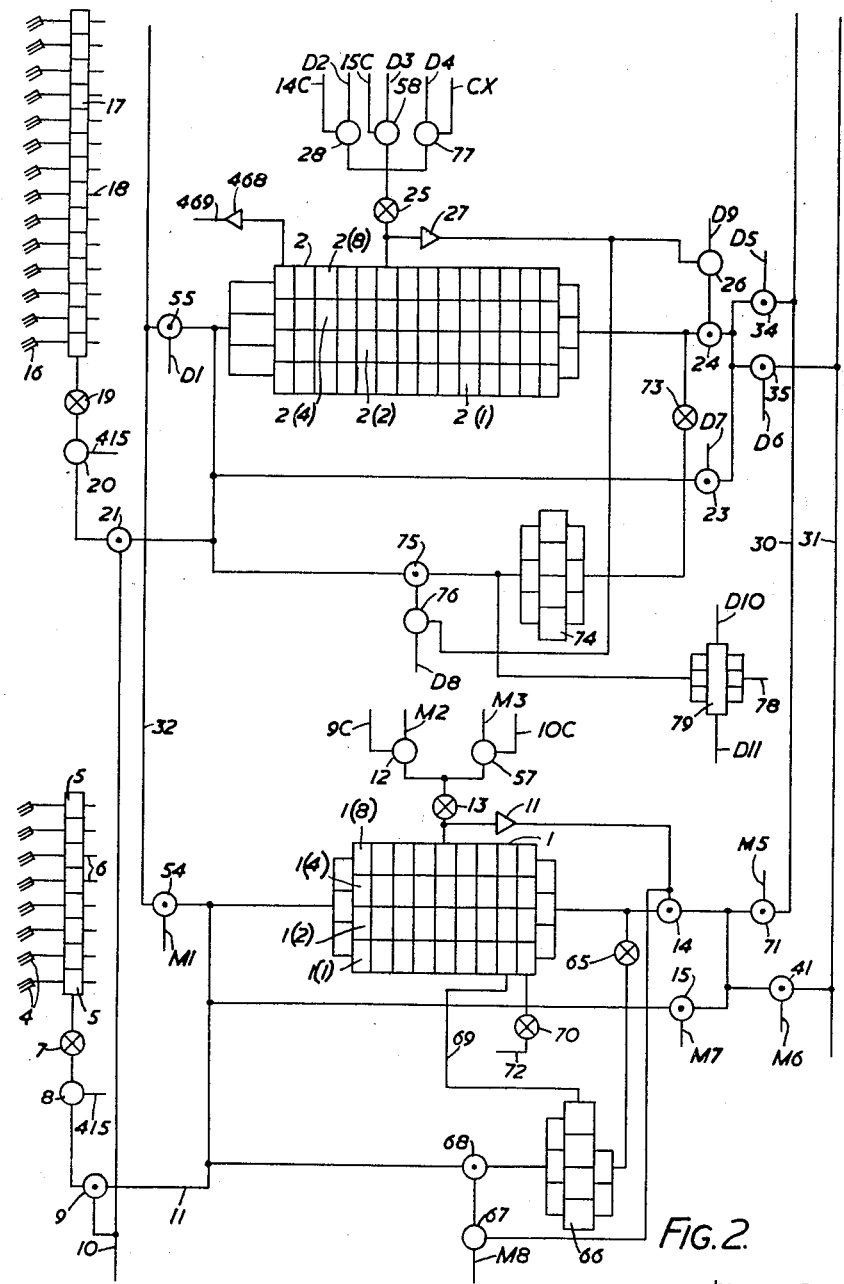

The multiplier, multiplicand and product values are held in three stores 1, 2 and 3 respectively (Figures 1 and 2). Each store consists of four shifting registers, corresponding to the four compartments 1, 2, 4 and 8 of the code. These registers are given suffixed references, such as 3(4) for the product register which stores the code component 4 of the product.

The shifting registers are of known type, comprising a trigger circuit for each stage, with diode coupling between each stage and the next in the chain to allow the setting to be moved along the register under control of shifting pulses. The presence of a code component is represented by the corresponding trigger circuit being "on."

3. Arithmetic unit—multiplier entry

As shown in Figures 1 and 2, the extreme right hand stages of each store register the least significant digit. If, for example, the number 94731 is stored in the multiplier register 1, the settings of the individual triggers will be as shown below, "X" indicating that a trigger is "on" and "—" indicating that it is "off":

Register 1(1)  0  0  0  0  9  4  7  3  1
                —  —  —  —  X  —  X  X  X Register 1(2)  —  —  —  —  —  —  X  X  —

Register 1(4)  —  —  —  —  —  X  X  —  —

Register 1(8)  —  —  —  —  X  —  —  —  —

After a shift pulse has been applied, all the settings will have moved one place to the right, so that the stored number will be 000009473.

The multiplier value is read from a punched card by a group of eight brushes 4. When any of these brushes encounters a hole in the card, it is allowed to make contact with a sensing roll, in the usual manner, to produce an electral impulse. The time of the impulse within the sensing cycle represents the digital value of the sensed hole. The values represented by these impulses are held temporarily in a capacitor storage unit 5, before transfer to the multiplier register in code from.

The card is fed with the "9" index point position leading. Suppose that there is a "9" hole in the first and last column of the eight column multiplier field, then the brushes will operate the related two units of the capacitor store 5. Before the next index point position is sensed by the brushes, all the units of the store 5 are scanned in time sequence by pulses applied to lines 6. All the units are connected in common to an inverter 7. Only a unit which has received an impulse from one of the brushes 4 is responsive to the scanning pulses. Since the first and last units have been operated, the amplifier 7 will receive an input corresponding to the first pulse of the scan pulse train, six blank positions, and the final pulse of the train.

The output from the amplifier 7 is fed to a gate 8, which feeds four gates 9. For the sake of clarity, the gates 9 are represented by a single symbol and the connections by a single line. A dot placed inside a symbol indicates that that symbol represents four similar units corresponding to the four code components.

Single valve gates, such as the gates 8 and 9, are operated by two positive inputs. One of these inputs is a control voltage which remains at a fixed value for a time which is long compared to the duration of the pulses used in the machine. The other input is a positive pulse. When both inputs are present the gate produces a negative output pulse.

If two gates are connected in cascade, the output of the first gate is fed through a pulse transformer, in order to obtain the correct polarity pulse for operating the second gate.

Each control voltage may assume either a high level or a low level. These levels may represent different voltages in relation to the ground line, according to whether the control voltage is supplied by a trigger, an inverter, a cathode follower etc. However, for convenience, the high and low levels will be referred to as positive and negative voltages, irrespective of their actual value in relation to ground.

The outputs of the gates 9 are connected to the input ends of the four registers of the multiplier store. Each of the gates 9 is controlled by one of four lines 10, the voltages of which are determined by four contacts, which are operated by cams driven synchronously with the card feeding mechanism of the punch.

When the "9" index point is being sensed, the lines 10, which are connected to the two gates 9(1) and 9(8) for the registers 1(1) and 1(8), are positive. Thus a single pulse from the inverter 7 will operate both the gates 9(1) and 9(8). The output pulses from the gates will switch "on" the first stage of each of the registers 1(1) and 1(8), to enter nine.

The scan pulses on the lines 6 are synchronised with shift pulses on a line 9C. These shift pulses are fed to all stages of the store 1 through a gate 12 and an inverter 13. Each of the multiplier store registers has nine stages, so that nine pulses are required for a complete shifting cycle, the ninth pulse occurring after the last of the scan pulses on the lines 6.

The first pulse from the gates 9 will enter nine into the input stages of the registers. The second to seventh shift pulses will each move this setting one stage towards the right hand end of the store. The pulse from the gates 9 corresponding to the last scan pulse will make a second entry of nine, and simultaneously the first setting will be shifted a further stage to the right. The last shift pulse will then move the first setting to the extreme right hand end of the store and the second setting to the eighth stage from the right. The two digits read from the card have now been entered in the multiplier store in the correct relative positions.

The gate 12 controlling the shift pulse is opened, during this entry operation, by a positive voltage on a line M2. The method by which this and other control voltages are produced at the required times will be described later, in connection with the operation of the control unit.

The extreme right hand, or output, stages of the multiplier store registers, control four gates 14, which also have pulses applied to them by the inverter 13, via a cathode follower 11. If one of the register stages is "on," the gate 14 controlled by it will pass the pulses.

The outputs of the gates 14 are fed to four gates 15 which are controlled by the voltage on a line M7. The outputs of the gates 15 are connected back to the inputs of the corresponding registers of the store 1. Thus, if the gates 15 are opened by a positive voltage on the line M7, whatever data is read out from the store by shift pulses will be re-entered into the store.

Before the "8" index point is sensed by the brushes 4, all the capacitor storage units 5 are reset. When the "8" index point position is sensed any holes in this position will cause the appropriate capacitor storage units 5 to be set up.

The cam contacts, which control the voltage on the lines 10, will now be set to apply a positive voltage to the gate valve 9(8). A train of scanning pulses on the lines 6 will therefore cause the appropriate stages of the register 1(8) to be set up to represent any digits of this value in the multiplier value.

The store 1 goes through a complete shifting cycle in synchronism with the scan pulses on the lines 6, as in the case of the "9" index point entry. Since the gates 15 are open, the settings already entered in the register will be shifted out and re-entered through these gates, so that at the end of the "8" index point, all the eight and nine digits of the multiplier will be set up in the correct relative positions in the store 1.

A similar scan and entry cycle is repeated for each of the remaining index points from "7" to "Y." At the end of the "Y" index point, all the digits of the multiplier value will be set up in the store 1. The "X" and "Y" index points are used to represent ten and eleven for sterling amounts.

The gates 15 and 9 may both be open during the whole of the entry cycle, since the multiplier digits are set up in the store 1 in their correct relative denominational positions. Hence the condition cannot arise in which a digit is being entered into the register by both the gates.

4. Arithmetic unit—multiplicand entry

The method of entering the multiplicand value into the store 2 is similar to that for entering the multiplier value. The field of the card containing the multiplicand value is sensed by brushes 16, and the digits of the value are entered index point by index point into capacitor storage units 17. The storage units 17 receive a train of scan pulses on lines 18. The outputs of the capacitor storage units 17 are connected to an inverter 19, which feeds a gate 20. The gate 20 drives four gates 21, which are selectively controlled by the voltages on the lines 10.

The output pulses from the gates 21 set the input stages of the store 2. As in the case of the multiplier store, the output of the store 2 is connected back to the input, through four gates 23, which are held open by a positive voltage on a line D7.

Entry of the multiplier and multiplicand values is concurrent. However, the multiplicand store 2 has a capacity of fourteen digits, so that only the first eight digits are entered simultaneously with the digits of the multiplier, the remaining six digits being entered in the same index point, but after the entry of the multiplier.

A gate 28 is made operative during the entry of the multiplicand by a positive voltage on a line D2. The gate supplies pulses from a line 14C to an inverter 25, which provides the shifting pulses for the store.

The least significant section of the store controls four gates 24, the output of which is fed to the gates 23. Pulses from the inverter 25 are fed to the gates 24 through a cathode follower 27 and a gate 26. The gate 26 is held open by a positive voltage on a line D9.

5. Arithmetic unit—product store

The product value is registered in the fourteen digit store 3 (Figure 1). There is no provision for entering into the store directly from a card.

Shifting pulses are applied to the store by a gate 52 and an inverter 53. The gate 52 is controlled by pulses on the line 14C and by the voltage on a line P2.

The output stages of the registers control four gates 48, which also receive pulses from the inverter 53, through a cathode follower 22. The output of the gates 48 is fed to four gates 51. If these gates are opened by the voltage on a line P7, the value read out will be fed back to the input of the store.

6. Arithmetic unit—adding

All the addition operations in the machine are performed by a single adding unit 29 (Figure 1) comprising four adders, one for each of the code components 1, 2, 4 and 8. Input to the adding unit is provided by two highways 30 and 31. Digits from the multiplier, multiplicand and product stores may be fed to either of the two highways. The output from the adding unit 29 is read out to a highway 32, from which digits may be routed to either the multiplier, multiplicand or product stores. Each of the highways 30, 31 and 32 comprises four wires, corresponding to the four code component form in which digits are registered in the stores.

It has already been explained how the gates 24 provide output pulses representative of digits which pulses may be fed back to the input of the multiplicand store through the gate 23. These pulses may also be fed to the highway 30, through gates 34, which may be opened by a positive voltage on a line D5. Pulses on the highway 30 are amplified by inverters 36 (Figure 1), the output pulses from which set four triggers 37.

Thus, for example, if nine is registered in the last section of the store 2, then the gates 24 will convert this registration to pulses. These pulses, via the highway 30 and the inverters 36, will then produce a corresponding registration of nine on the four triggers 37.

Figure 13:
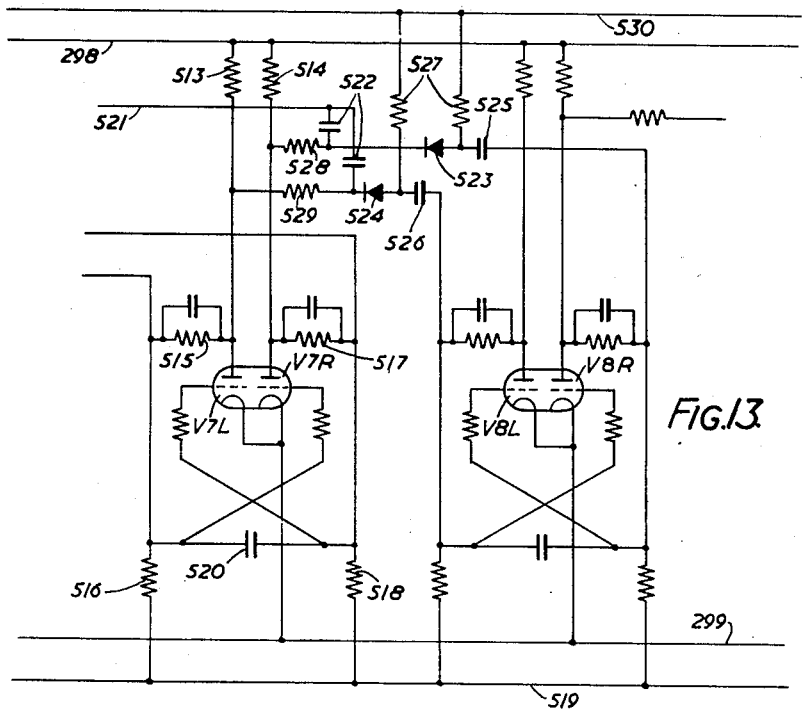
Figure 13 is a circuit diagram of two stages of a shifting register.

All the triggers used in the machine are of the same type and their circuits are similar to the triggers of the shifting register illustrated in Figure 13 and to be described hereinafter. Each trigger thus comprises a pair of cross-connected tubes having separate input connections to the control grids of the tubes. A trigger is "on" when its right hand valve is conducting and can be set "on" by the application of a pulse to the grid of the left hand tube; it can also be reset "off" by the application of a pulse to the grid of the right hand tube. When the grids are commoned, alternate pulses set the trigger "on" and "off" successively. The setting of the trigger may be used to control other devices via a connection from the anode of one or other of the tubes of the trigger. Thus, in the case of each of the triggers 37, the grid of the left hand tube is connected to the high-way 30, the grid of the right hand tube is connected to a line C2, to which negative clock pulses may be applied to reset the triggers to zero, and the anode of the left hand tube is connected to an inverter 38 coupling the trigger with the corresponding adder of the adding unit 29.

The pulses, on the highway 30, for setting the triggers were originally timed by clock pulses on the line 14C, but in passing through the various gates and inverters they are slightly delayed and lengthened. This allows the setting pulses from the inverters 36 to over-ride the effect of the resetting pulses on the line C2. Consequently, if a trigger 37 receives both a setting pulse and a resetting pulse then it is set; whereas, if it receives a resetting pulse alone then it is reset.

The output pulses from the gates 24 may also be fed to the highway 31 through gates 35, which are controlled by a voltage on a line D6. The pulses on the highway 31 set four triggers 40, through inverters 39, in the same way as for the highway 30 triggers 40 being similar to triggers 37 and similarly connected. The four trigger circuits 40 control four D.C. coupled gates 44, the output from which is fed to another of the inputs of the four adders in the adding unit 29. The triggers 40 also control a complementing circuit 42 to be described in greater detail hereinafter in relation to Figure 7 and, the output from circuit 42 is fed to the same adder inputs as the output from the gates 44.

The gates 44 are controlled by the voltage on a line A7, and the complementing circuit is also controlled by the line A7, through an inverter 45. The gates 44 and the gates in the complementing circuit are operated by negative inputs. Consequently, when the voltage on the line A7 is positive, the complementing circuit will be operative, and when it is negative, the gates 44 will be operative. Thus, the voltage on the line A7 controls whether the adding unit 29 receives the digit fed to the highway 31, or the complement of that digit.

The values from the multiplier and product stores may also be fed to either of the highways 30 and 31. The gates 14 of the multiplier store are connected to two sets of four gates 41 and 71. If a line M5 is positive, the gates 71 are opened and the value is fed to the highway 30. If a line M6 is positive, the gates 41 are opened and the value is fed to the highway 31.

The product store has gates 49 and 50, which are controlled by lines P5 and P6. The gates 49 and 50 allow a value from the product store to be read on to the highways 30 and 31 respetcively.

7. Arithmetic unit—read out from adding unit

The output of the adding unit 29 controls four gates 46, the outputs of which are connected to the lines of the highway 32. Pulses are applied to the gates 46 from a gate 47. The gate 47 is always held open by a positive voltage on a line A4, except during a special zeroising operation.

The triggers 37 and 40 act, in effect, as an additional shifting register stage for each register which is connected to the adding unit. In other words, if the product store is feeding the highway 30, then it is equivalent to a fifteen digit store feeding the adding unit directly. For this reason, the gate 47 receives fifteen pulses if a value from the multiplicant or product stores is being fed to the adding unit, and ten pulses if the multiplier store is being used.

A line A2 is negative except when the multiplier value is being transferred. This controls a gate 255 through an inverter 123, so that this gate is open when the line is negative. Fifteen pulses are applied to the gates 255, on the line 15C.

When the line A2 is positive it opens a gate 256 and closes the gate 255. Ten pulses are applied to the gate 256, on the line 10C.

Equally, it is necessary to apply an extra shifting pulse to any of the stores which is receiving an entry from the adding unit, in order to position the lowest denomination in the extreme right hand stage of the store.

When the product store 3 receives an entry from the adding unit, a line P3 is made positive to open a gate 59. Fifteen pulses are applied to the gate 59 by a line 15C. The output of the gate is connected to the inverter 53.

In the same way, fifteen shifting pulses may be applied to the multiplicand store 2 (Figure 2), through a gate 58, which is controlled by pulses on the line 15C and by a line D3. For the multiplier store 1, ten shifting pulses may be applied through a gate 57, which is controlled by pulses on a line 10C and by a line M3.

The multiplier, multiplicand and product stores have input gates 54, 55 and 56 respectively. When any of these gates are opened they allow pulses to be fed from the highway 32 to the input of the related store. These gates are opened by a positive voltage on lines M1, D1 and P1, respectively.

8. Arithmetic unit—Auxiliary stores

Additional storage is provided for values which may require to be added to a product, or to form the multiplier in a second multiplication of a calculation. This facility is provided by a plurality of capacitor storage units, which are generally similar to those which form the temporary store 5 for the multiplier.

One such store 33 (Figure 1) comprises thirty-six capacitor units arranged in four groups of nine, 33(1), 33(2), 33(4) and 33(8). Since the values in the auxiliary stores have to be held until required in the calculation, the values cannot be read on to one capacitor unit per denomination and cleared after each index point. Instead, a value read by the brushes is stored on relays. The contacts of the relays then control entry of the value in coded form into the store 33, via the lines 60. Thus, after the transfer, a value is held in the store 33 in the same form as in the main stores.

The outputs of each group of nine units are connected in common to one of four inverters 63. Scan pulses are applied to the four units of each denomination by lines 61. The outputs of the inverters 63 are fed to four gates 64, which are also controlled by a line S1. Scan pulses are applied to the store whenever a read out is required from any of the auxiliary stores and the stored value may be read out on to the highway 31 by opening the gates 64.

Four similar auxiliary stores (not shown) are provided, each of fourteen digit capacity. The outputs from the inverter stages of these stores are fed to gates 164, 165, 166 and 62. These gates are opened by a positive voltage on lines S2, S3, S4 and S5 respectively. The outputs of the gates 164, 165 and 166 are connected to the highway 31. The outputs of the gates 62 are connected to the highway 30.

9. Arithmetic unit—MR halving

In performing multiplication the multiplier value is repeatedly halved until it is reduced to zero. In halving, an odd number is treated as though it were the next lower even number, that is, fractions are ignored.

The stages of the registers 1(2), 1(4) and 1(8), which represent the least significant digit, are connected through inverters 65 to the input of a halving circuit 66. The halving circuit 66 controls four gates 68, the output from which is fed back to the input of the store 1. The gates 68 are also controlled by pulses from a gate 67. The gate 67 is controlled by pulses from the cathode follower 11, and the voltage on a line M8. Thus, the halved value is read back into the store only if the gate 67 allows pulses to pass to the gates 68.

When any odd digit, except the least significant, is halved, it produces an entry of five into the next lower denomination. To deal with this, the last but one stage of the register 1(1) controls the halving circuit 66, via a line 69. If this stage of the register is "one" then it controls the halving circuit to add five, to half the value of the digit which is registered in the last stages of the store.

It is also necessary to determine, before each halving operation, whether the multiplier value is even or odd, in order to control the building up of the product from the multiples of the multiplicand. For this purpose, an odd/even detector is controlled by a line 72, which is connected to the last stage of the register 1(1), through an inverter 70.

10. Arithmetic unit—MC doubling

The last section of the multiplicand store 2, is connected through inverters 73 to a doubling circuit 74. The output from the doubling circuit 74 controls four gates 75, the outputs of which are connected to the input of the store 2. The gates 75 receive pulses from a gate 76. The gate 76 is controlled by the voltage on a line D8 and by pulses from the cathode follower 27.

11. Arithmetic unit—Division by ten

Provision is made for dividing the value in the multiplicand register by ten. This value may be divided by ten as many times as may be desired, a complete shifting cycle of the store being required for each division operation.

If the number in the multiplicand store is expressed in decimal, then division by ten is effected by shifting each of the digits in the multiplicand store one stage to the right, the lowest digit of the original value being "lost." This is so, since each stage of the store is given a particular denominational significance by the method of entry.

The gates 26 and 35 are opened to allow the contents of the multiplicand store to be fed to the highway 31. Nothing is fed to the highway 30, so that the digits from the multiplicand store pass through the adder unchanged. The gates 47 (Figure 2) and 55 are also opened to allow the outputf rom the adder to be fed back to the input of the store 2. The gates 58 and 255 are opened to allow fifteen shifting pulses to be applied to the store 2 and the adding unit gates 46 which, as already explained, will result in the multiplicand value being re-entered into the store in its original position. However, a gate 77 is also opened for division, under control of a line D4. This gate has a pulse applied to it on line CX, one pulse time earlier than the first pulse on the line 15C. Thus the lowest digit is stored on the triggers 40 and the next on the last section of the store, before the normal shifting cycle commences. The highest stages of the store will register zero, since no pulse was applied to the gates 46.

The first pulse on the line 15C will set up the second digit of the multiplicand value on the triggers 40. At the same time, a pulse to the gates 46 will read the first digit back from the adding unit into the register.

After thirteen pulses on the line 15C, thirteen digits of the multiplicand will have been re-entered in the store, and the last section will be registering zero. The fourteenth pulse shifts the zero setting to the triggers 40 and returns the multiplicand to the original position in the store. The fifteenth pulse shifts the multiplicand down one position in the store, reads zero into the highest stages of the store, under control of the triggers 40, and shifts the first digit of the original multiplicand to the triggers 40.

This is the end of the shifting pulse cycle, so that the next clock pulse on the line C2 will reset the triggers 40, without there being any read out from the gates 46. This leaves the multiplicand value in the store, shifted one position to the right relative to the position at the beginning of the shifting cycle. A similar cycle may be repeated to obtain a further division by ten, and so on.

If the value in the multiplicand store is in a non-uniform notation, such as sterling, the division problem becames more complex, because a single digit of the original value can produce entries into two denominations. For example, one shilling divided by ten is equal to 1.2 pence.

Suppose that a sterling value in the store 2 has been shifted, during a division cycle, to a position in which the pence value is registered on the triggers 40, and the units of shillings value in the last section of the store. This pence value will become tenths of pence when the shifting cycle is completed. However, it is necessary to increase this value by .2 pence for every shilling registered in the last section of the store. Twice the shillings value is available at the output of the doubling circuit 74. This value is fed to the adding unit, via a divide by ten correction circuit 79 and lines 78 (Figures 1 and 2).

The doubling may produce a carry, which is stored in the doubling circuit. The units digit of the doubled value is read out to the adding unit under control of a line D10. One pulse time later, any carry is similarly read out under control of a line D11. At this time the units of shillings digit will be shifted on to the highway 31, and will finally become the pence value. This, after the last shifting pulse the value standing in the store will be the result of dividing the original shillings and pence value by ten.

The divide by ten circuit 79 is also used to provide the necessary correction when dividing the units of pounds to form shillings. The circuit 79 is operative to allow read out of twice the pounds value to form the final shillings value. The gate 26 is then made inoperative for the next shifting pulse, to prevent the units of pounds value being read out to the highway 31. After this, the operation is the same as for a decimal value. It will be apparent that by suitably controlling the operation of the divide by ten circuit 79, that other non-uniform notations, such as tons, cwts. and quarters or Indian currency, may be dealt with in a similar way.

12. *Arithmetic unit—product read out*

In order to record a calculated product, plug connections are made from a group of sockets 436 to the punch magnets for the columns of the card in which the value is to be punched. This places each punch magnet in the anode circuit of one of a group of gas tetrodes 435. One control grid of each tetrode is connected to one of a group of lines 110, to which are applied a train of scan pulses, corresponding to those on the lines 18 of the multiplicand temporary store 17. The other control grids of the tetrodes are connected in common to a coincidence detecting circuit 432.

One input for the coincidence circuit 432 comes from the last stages of the product store 3, through cathode followers 430 and inverters 431. The other input is from the lines 10, which also control the coding of the input data.

There is a complete shifting cycle of the store 3 as each index point position of the card is under the punches. At the "9" index point, the lines 10 will assume voltages representative of that digit, and the coincidence circuit 432 will produce a positive output whenever the lowest digit in the store is also a nine. This will bring one grid of all the tetrodes 435 above cut-off. However, the other grid of the tetrodes will be below cut-off, except for that one which is receiving a scan pulse on one of the line 110, and this valve will be the only one to fire.

Thus, at the end of the shifting cycle, any "9's" in the product value will have caused firing of the tetrodes 435 in the corresponding denominational positions. The fired tetrodes will energise the punch magnets to record the digits. At the next index point the circuit 432 will fire the appropriate tetrodes to record the "8's", and so on for the remaining digits.

Product read out may be suppressed by an inverter 433, the output of which is commoned with the output from the coincidence circuit. If an input line 434 is positive, the inverter will hold the grids of the tetrodes 435 negative, irrespective of the output of the coincidence circuit. If the line 435 is negative, then the coincidence circuit is free to control the tetrodes. The line 434 may be made negative by a contact of a relay, which is energised when an accumulated product total is to be read out.

The gates 51 are held open during read out by a voltage derived from the line P7, through a pair of inverters 437. This allows the product value to re-circulate in the store. The store may be zeroised by making a line 439 positive before the shifting cycle, for the last index point, takes place. The output of an inverter 438, controlled by the line 439, is also connected to the gates 51 and holds them closed when the line 438 is positive. This prevents re-circulation of the product value and leaves the store at zero after the final shifting cycle.

13. *Control unit—general*

The control unit serves four interlinked functions:
(i) To control the input and output of data to and from the calculator;
(ii) To sequence the performance of the various arithmetical operations such as addition and multiplication, in the order required for a particular calculation;
(iii) To provide control voltages for the gates in the arithmetic unit in accordance with the operation which the arithmetic unit is to perform;
(iv) To povide timing and operating pulses such as the clock pulses on the lines C2, C14, C15 etc.

The basic pulse repetition frequency of the calculator is determined by a free-running multi-vibrator 82 (Figure 3), of known form which provides clock pulses on lines C1 and C2. The clock pulses drive a primary timer 81 which provides sixteen output pulses, on separate lines, at the same repetition frequency as the clock pulses. the output pulses from the primary timer 81 are used for such purposes as reading in data, and for providing shifting pulses for the stores in the arithmetic unit. A group of sixteen pulses produced in one cycle of the primary timer will be referred to as a "minor cycle" of the calculator.

Sequencing of the operations in the arithmetic unit is controlled by a programme timer 80 having twenty steps. As will be explained later each programme step may control a simple operation such as transfer from one store to another, which occupies one minor cycle, or a complex operation such as a complete multiplication, which occupies a large number of minor cycles.

14. *Control unit—clock pulse generator*

The multi-vibrator 82 is of the well known type employing a pair of triodes with the grids and anodes A.C. cross-coupled. The recurrence frequency of the square wave output from the multi-vibrator is determined by the time constants of the coupling networks. This square wave output is applied to a gate 84 by capacitatively coupling the anode of the left hand tube of the multi-vibrator to gate 84; 84 is operative when a switch 83 is in the position shown in Figure 3. The output from the gate 84 is fed to an inverter 85, which drives a cathode follower 86 through a differentiating network. The differentiating circuit provides alternate positive and negative pulses corresponding to the change over points of the square wave input to the inverter 85. The negative pulses are partially clipped by "cut-off" in the cathode follower 86. The positive pulses from the cathode follower 86 are used to drive two gates 87 and 91.

It is convenient to adopt a convention for trigger circuits similar to that used for gates. The anodes of a trigger will be referred to as "high" and "low," to indicate the anodes of the non-conducting and conducting valves respectively, when the trigger is "on," or is registering "one."

A trigger 88 is switched "on," by a pulse on a line 101 connected to the grid of the left hand tube of the trigger, at the beginning of data input or output, and at the start of a calculation. The gate 87 is controlled by the high anode, i.e. the anode of the left hand tube, of the trigger 88, so that the gate is open when the trigger is "on." The first positive pulse from the cathode follower 86, to occur after the trigger 88 is switched "on," is passed by the gate 87 and is fed to the trigger 88 by the line 18a connected to the grid of the right hand tube to switch it "off."

The trigger 88, in switching "off," produces a pulse, which is fed, by an inverter 89 connected to the anode of the right hand tube of the trigger 88, to the left hand grid of a trigger 90 to switch it "on." The high or left hand anode of the trigger 90 controls the gate 91, so that it is opened, and the output pulses are fed to a gate 92.

The gate 92 is normally held open by a positive voltage on a line 93. The negative pulses from the gate 92 are fed, in common, to two inverters 94 and 96. The inverter 94 feeds positive pulses to a cathode follower 95 which drives the positive clock pulse supply line C1. The inverter 96 feeds a further inverter 97, to provide negative clock pulses on a line 102. These pulses are fed to the line C2 through a cathode follower 98 and also to the primary timer 81.

15. *Control unit—primary timer*

The primary timer 81 consists of a shifting register of sixteen stages, 81(X) and 81(1) to 81(15). Each of the register stages is similar to those used in the storage registers of the arithmetic unit. The line 102 is connected in common to all the register stages, so that the negative clock pulses thereon act as shifting pulses for the primary timer.

Before the first card is sensed for entry into the calculator, the stage 81(X) of the primary timer is switched "on" by a pulse on a line 103. This pulse is derived from the control circuits of the card sensing mechanism. The other stages of the primary timer are intially "off." When the trigger circuit 90 allows clock pulses to appear on the line 102, the setting of the stage 81(X) will be shifted along the primary timer register, so that each stage is switched "on" and then "off" in turn.

The first pulse on the line 102 will switch the stage 81(X) "off" and the stage 81(1) "on." The output pulse produced by the stage 81(X) in switching "off" is fed to an inverter 104, which drives a cathode follower 109. The same arrangement of an inverter 104 and a cathode follower 109 is provided for each of the sixteen stages of the timer.

The inverters 104 for the stages 81(2) to 81(15) also drive cathode followers 105 and 106. Each of the cathode followers 105 is connected to one of the lines 18 and 110, to provide the scan pulses which control read in of the multiplicand value and read out of the product value. The output pulses from the cathode followers 105 for the register stages 81(2) to 81(10) are also fed to the lines 6, which control entry of the mutliplier value. Thus, the cathode followers 105 of the primary timer supply the trains of scanning pulses necessary for reading values into, and out of, the calculator.

The pulses from the cathode followers 106 are fed to the scanning lines 61 for the capacitor store 33. The store 33 has a capacity of nine digits only, so that the output from the cathode followers 106 for the stages 81(2) to 81(10) only are connected to this store. The cathode followers 106 also provide scan pulses for the capacitor stores which feed the gates 164, 165, 166 and 62. The output from the cathode followers is normally suppressed by a clamping circuit 108, which is controlled by a line 121.

The last stage 81(15) of the primary timer is connected back to the first stage 81(X). Thus, the register 81 forms a closed loop, and as long as pulses continue on the line 102 the original setting of the stage 81(X) will re-circulate round the register.

16. *Control unit—shifting pulse generator*

The primary timer controls the supply of pulses, to lines 9C, 10C, 14C, 15C, and CX, which are used for shifting the registers, and reading out from the adding unit 29.

Figure 4:
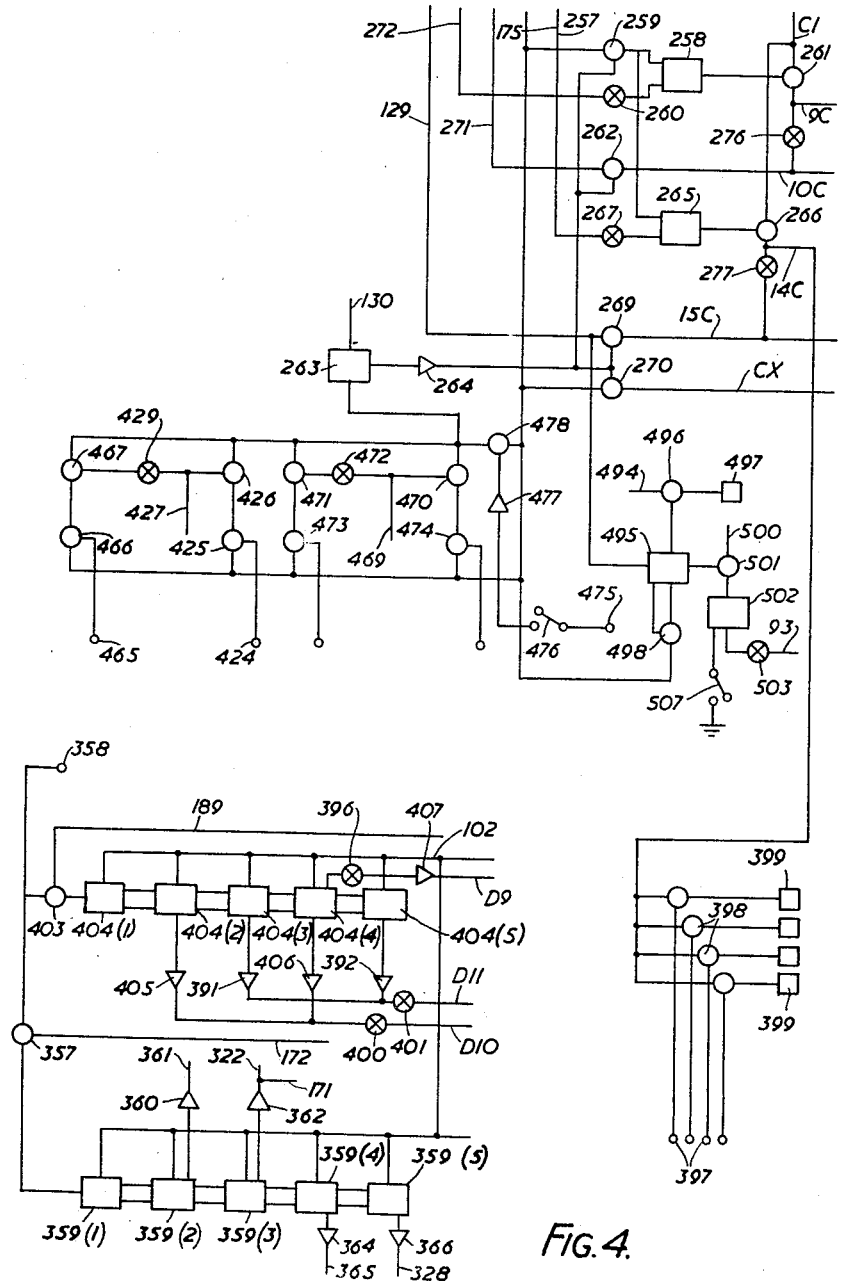

The generation of nine pulses on the line 9C is timed by a trigger 258 (Figure 4). This trigger is switched "on" by a pulse from the primary timer stage 81(1), via a line 175 and a gate 259 connected to the grid of the left hand tube of trigger 258, and switched "off" by a pulse from the stage 81(10), via a line 272 and an inverter 260 connected to the grid of the right hand tube of trigger 258. The high or left hand anode of the trigger 258 controls a gate 261, which receives positive pulses from the line C1. This gate feeds the line 9C, and also an inverter 276, through a pulse transformer.

The output of the inverter is fed to the line 10C through a pulse transformer. A further pulse is fed to this line by a gate 262, which receives a pulse from the stage 81(11), via a line 271.

A trigger 265 controls a gate 266, to generate fourteen pulses on the line 14C, in the same way as for the line 9C. The trigger is connected similarly to trigger 258 and is switched "on" by the same pulse as the trigger 258 and is switched "off" by a pulse from the stage 81(15), via a line 257 and an inverter 267.

The pulses on the line 14C are fed to the line 15C through an inverter 277. A further pulse is fed from the stage 81(X), via a line 129 and a gate 269.

Finally, a pulse is fed from the line 175, through a gate 270, to the line CX.

The gates 259, 262, 269 and 270 are normally held open by a connection from the low or right hand anode of a programme cancel trigger 263, through a cathode follower 264. This trigger may be switched "on," under certain conditions, by the application of a pulse on line 130 connected to the grid of the right hand tube of the trigger, thus closing the gates and cutting off the supply of shifting pulses.

17. *Control unit—programme timer*

The programme timer 80 consists of a shifting register of twenty stages 80(1) to 80(20). Shifting pulses are applied to the programme timer, via a line 114, a shifting pulse occurring for each operation which is completed.

At the beginning of a calculation, a trigger 119 is switched "on" and a pulse is applied, through an inverter 120 capacitatively connected to the anode of the left hand tube of trigger 119, to the stage 80(1) of the programme timer to switch it "on." Thus, nineteen shifting pulses on the line 114 will cause each stage of the programme timer to be switched "on" in turn.

The low anode of each stage of the programme timer drives a cathode follower 116, through an inverter 115. The output voltage of the cathode followers 115 will be high when the corresponding stage of the programme timer is "on," and low when it is "off." The output voltage from each cathode follower is fed to a group of plug sockets 118, through isolating rectifiers 117. The voltages at the plug sockets 118 are used, indirectly, to control the gates in the arithmetic unit.

18. *Control unit—single functions*

In general, it is necessary for several gates in the arithmetic unit to be opened, to allow any particular function of the calculator to be performed. To simplify the control connections necessary for setting up a desired programme, a function matrix (Figures 5 and 6) is provided, which has a single plug socket corresponding to each of the basic functions of the calculator. By connecting the appropriate plug socket or sockets of the function matrix to the desired programme step the desired group of gates in the arithmetic unit are automatically operated.

For example, suppose it is desired to transfer a decimal value in the multiplicand store 2 into the product store 3, on programme step 2. Plug connections (not shown) are made from the sockets 118 of the stage 80(2) of the programme timer (Figure 3), to a socket FMCA (Figure 5) (From Multiplicand A), a socket TP (To Product), and a socket DT (Decimal Transfer). When the programme timer stage 80(2) switches "on" the voltage of the sockets 118 will rise, thus causing the voltage of the sockets FMCA, TP and DT also to rise. This voltage increase will be transferred from the socket FMCA to the lines D2 and D5, through cathode followers 125 and 126. This causes fourteen clock pulses to be fed to the multiplicand store 2 through the gate 28, and opens the gate 34, to allow the multiplicand value to be shifted on to the highway 30 (Figure 2).

The voltage increase at the socket TP will be fed to the lines P1 and P3, through cathode followers 127 and 128. The voltages on the line P3 open the gate 59 (Figure 1) to allow fifteen shifting pulses to be applied to the product store 3. The voltage on the line P1 opens the gates 56, to connect the output highway 32 from the adder to the input of the product store. The voltage on the line A2 will be low, and the voltage on the line A4 will be high, so that fifteen pulses will be fed through the gates 255 and 47 to the gates 46, to read the value out of the adding unit 29 on to the highway 32. Thus, plugging to the sockets FMCA and TP has allowed programme step 2 to open the necessary gates to allow the multiplicand value to be read on to the highway 30, into the adder and the output from the adder to be fed to the product store.

The rise in voltage on the socket DT is fed to a gate 131 through a cathode follower 132. When the primary timer 81 (Figure 3) has completed one minor cycle, a pulse will be fed to the gates 131 via a line 129. This pulse will be passed by the gate to a line 130 to indicate that the transfer operation has been completed.

The majority of the function matrix plug sockets control single functions, that is to say, functions which are completed in a single minor cycle. The functions which can occupy more than one minor cycle will be discussed in the next section. There are so many possible combinations of plugging that it is not considered practicable to describe each of them in detail. Accordingly the sockets listed, together with a description of their function and the gates which they control in the arithmetic unit. It is believed that this, in conjunction with the description already given of the arithmetic unit, will enable the operation of the function matrix to be understood. Certain functions, such as "zero test," are discussed in later sections.

| Socket | Function | Cathode Followers | Control Lines | Arithmetic Unit Gates Operated |
|---|---|---|---|---|
| RP | Recirculate value in product store 3. | 133 | P7 | 51 |
| RMC | Recirculate value in multiplicand store 2. | 134 | D7 | 23 |
| RMR | Recirculate value in multiplier store 1. | 135 | M7 | 15 |
| FPB | Feed product value to highway 31. | 136/137 | P2/P6 | 52/50 |
| TP | Enter in product store from highway 32. | 127/128 | P1/P3 | 56/59 |
| ZT | Zero test of product store. | 140/139 | P2/P5 162 | 52/49 |
| FPA | Feed product value to highway 30. | 141/142 | P5/P2 | 49/52 |
| TMC | Enter from highway 32 in multiplicand store. | 144/145 | D1/D3 | 55/58 |
| FMCA | Feed multiplicand value to highway 30. | 125/126 | D2/D5 | 28/34 |
| FMCB | Feed multiplicand value to highway 31. | 146/147 | D2/D6 | 28/35 |
| TMR | Enter value from highway 32 in multiplier store. | 148/149 150 | M1/M3 A2 | 54/57 256 |
| FMRA | Feed multiplier value to highway 30. | 151/152 | M2/M5 | 12/71 |
| FMRB | Feed multiplier value to highway 31. | 138/143 | M2/M6 | 12/41 |
| FS1 | Read from capacitor store No. 1 (33) to highway 31. | 153/154 | S1/121 | 64 |
| FS2 | Read from capacitor store No. 2 to highway 31. | 155/156 | S2/121 | 164 |
| FS3 | Read from capacitor store No. 3 to highway 31. | 157/158 | S3/121 | 165 |
| FS4 | Read from capacitor store No. 4 to highway 31. | 159/160 | S4/121 | 166 |
| FS5 | Read from capacitor store No. 5 to highway 30. | 184/185 | S5/121 | 62 |
| CB | Enter the value on highway 31 in to the adding unit in tens complementary form. | 161/163 | A7/351 | 43/350 |
| CB9 | Enter in lines complement form. | 506 | A7 | 43 |
| DT | Decimal transfer between stores. | 132 | | |
| ST | Sterling transfer between stores. | 167/169 | 172 | |
| MT | Mixed scale transfer between stores. | 168/170 | 171 | |
| DD | Divide the multiplier value by 2. | 176/177 | M2/M8 | 12/68 |
| X2 | Multiply the value in the multiplicand store by 2. | 178/179 | D2/D8 | 28/76 |

The cathode followers in the function matrix serve both to isolate the control lines and also to prevent undue loading of a function plug socket which has to operate several control lines.

19. Control unit—Multiple functions—divide by ten

It has already been explained that a value in the multiplicand store may be divided by ten, an operation which requires one minor cycle. However, provision is made for several such minor cycles to take place in succession, on a single programme step. The value in the store may then be divided by ten, a hundred, a thousand etc., as required. A maximum of seven cycles of division, in succession, is available on a single programme step.

Division by ten is called by plugging from the appropriate plug socket 118 of the programme timer to a socket D10D, if the value in the multiplicand store is decimal, or to a plug socket D10S, if the value is sterling. A plug connection is also made from the same programme step to one of a group of sockets 1T to 7T, to select the desired number of cycles, from one to seven. An increase of voltage at the socket D10D, is transferred to the control lines D1, D3, D4 and D6 through cathode followers 174, 180, 181, 182 and 183. This allows a train of sixteen shifting pulses to be applied to the multiplicand store, through the gates 58 and 77. The output from the store is fed to the highway 31, through the gates 35, through the adding unit 29, and back into the store through the gates 55.

The input to the socket D10S controls a cathode follower 173, the output of which is commoned with the output of the cathode follower 174, so that raising the voltage of the socket D10S, brings the same gates into operation as for the socket D10D. The socket D10S also controls a cathode follower 188, which, through a line 189, controls a circuit which determines the voltage on the control lines D9, D10 and D11. It also controls a cathode follower 187, the output of which is connected to the line 172 controlled by the sterling transfer socket ST.

Control of the number of minor cycles for division is obtained by entering the complement to eight of the number of cycles required into a three stage binary counter, and detecting when a carry occurs from the last stage. The binary counter comprises triggers 195, 196 and 197, and the carry from the last 197 is registered on a further trigger 198. All the four triggers are normally "off," and each is coupled to the next through an inverter 199 i.e. the inverter is connected to the anode of the right hand tube of the trigger of lower significance and to the grid of both the tubes of the trigger of higher significance. Each trigger in switching from "on" to "off" applies a switching pulse to the next trigger.

Each of the sockets 1T to 7T controls a cathode follower 201, which, in turn, controls one, or more, of three gates 192, 193 and 194, isolating rectifiers 200 preventing commoning between the circuits. As an example, it will be assumed that the multiplicand value is to be divided by 1,000, that is, three cycles of division are necessary. Accordingly the socket 3T is connected to the socket 118 of the particular programme step.

When this programme step is reached, the cathode follower 201 for the socket 3T will raise the control voltages for the gates 192 and 194. At the beginning of the first minor cycle of this programme step, a pulse will be applied, via a line 190, to the three gates 192, 193 and 194. This pulse will pass by the gates 192 and 194 and the outputs from these gates will set the triggers 195 and 197, thus setting the counter to register five.

One pulse time later, a pulse from the stage 81(2) of the primary timer will be fed, via a line 218, to a gate 191, which is controlled by the outputs from the two cathode followers 173 and 174. The output from the gate 191 is fed to the trigger 195 so that a further "one" will be entered into the counter. A further pulse will be entered into the counter through the gate 191 at the beginning of the second and third minor cycles of the programme step. The pulse entered at the beginning of the third cycle brings the total entry to the counter to eight, so that the trigger 197 will produce a carry pulse to switch "on" the trigger 198.

The high anode of the trigger 198 controls a gate 202, which also receives a pulse at the end of each minor cycle, on the line 129. The pulse which occurs at the end of the third minor cycle of the programme step, will be passed by the gate 202 to the trigger 198 to switch it "off." In switching "off" the trigger 198 produces an output pulse, which is fed by an inverter 204 to the line 130, to indicate that the operation has been completed.

20. *Control unit—multiple functions—multiply*

Although the operation of multiplication requires a considerable number of minor cycles, it is controlled by making a single plug connection from the required programme step to a socket DM (Figure 6), for decimal multiplication, or a socket SM, for sterling multiplication. These two plug sockets control a gate 209, through cathode followers 205 and 206. At the beginning of the first minor cycle when either of these sockets is activated, a pulse from stage 81(1) of the primary timer (Figure 3) is fed, from the line 175, through gates 211 and 209 to switch a trigger 210 "on." The trigger 210 controls a cathode follower 212, so that the voltage of a line 213 rises when the trigger is "on." The line 213 controls the voltage of the control lines D8, M8, D2 and M2 (Figure 5) through cathode followers 214, 215, 216 and 217. These control lines open the necessary gates in the arithmetic unit to allow the multiplier value to be halved, and the multiplicand value to be doubled, on each minor cycle.

The line 213 also controls a gate 219, through cathode follower 203. A pulse from the stage 81(2) of the primary timer is fed, by the line 218, to the gate 219. This pulse will be passed to a further gate 220 if the multiply trigger 210 is "on." The gate 220 is controlled by the voltage on the line 72 (Figures 2 and 6), which is positive if the least significant stage of the multiplier register 1(1) is "on." Consequently, if the multiply trigger 210 is "on," and the last digit of the mutliplier value is odd, the gate 220 will pass a pulse to switch "on" an odd/even detector trigger 221.

When the trigger 221 is "on" it raises the potential of a line 224, through an inverter 223. The increase in voltage of the line 224 is fed to the control lines P1, P3, P5 and D5 (Figure 5) through cathode followers 225, 99, 100 and 107. This opens the necessary gates in the arithmetic unit to allow the multiplicand and product values to be fed on to the highways 31 and 30 respectively, to be added by the adding unit 29, and the sum to be fed back into the product register. Thus, as long as the multiply trigger 210 is "on" the multiplier value is halved and the multiplicand value is doubled on each minor cycle, and the multiplicand value is added to the value in the product register, if the corresponding multiplier value is odd. At the end of each minor cycle a pulse is fed from the primary timer unit 81(X), to an inverter 222, the output from which switches "off" the odd/even detector trigger 221.

Figure 5:
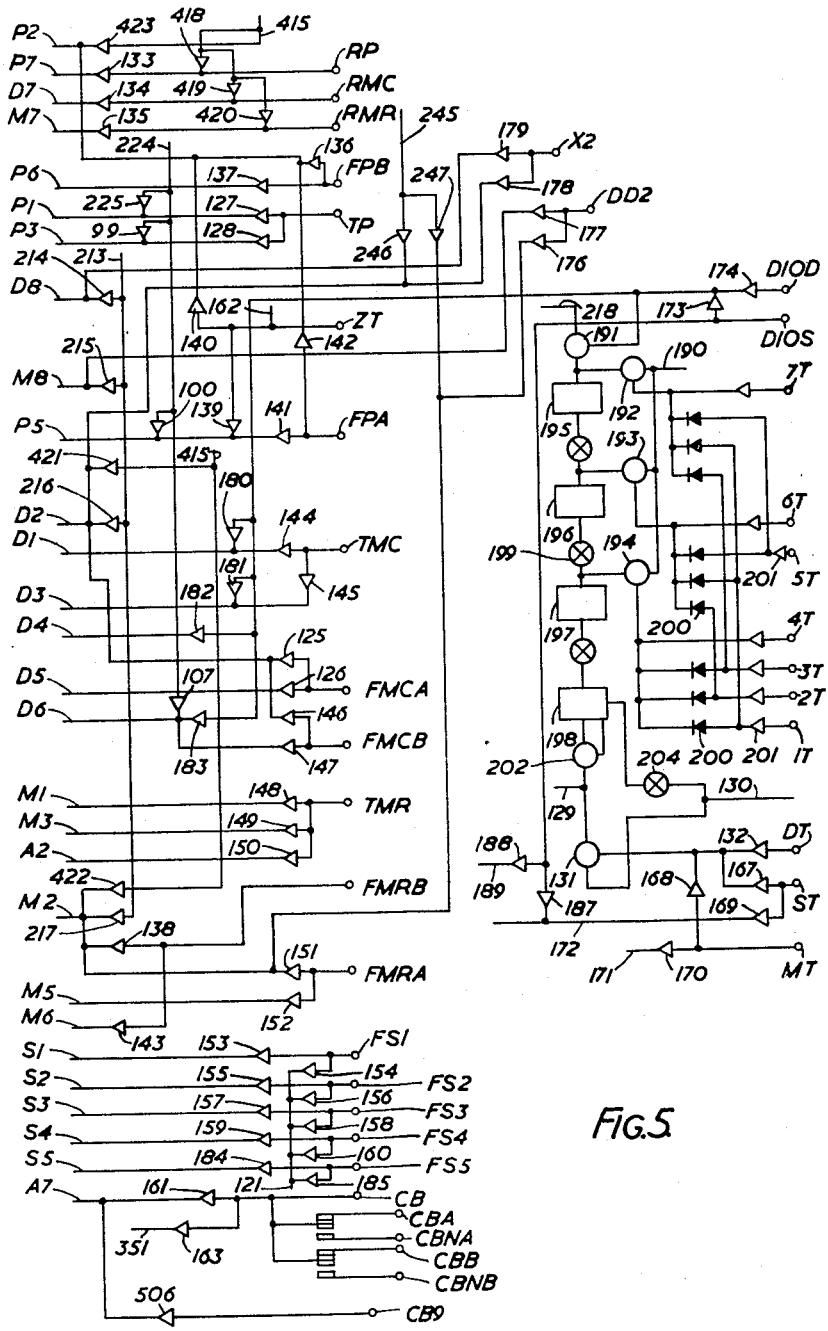
Figure 6:
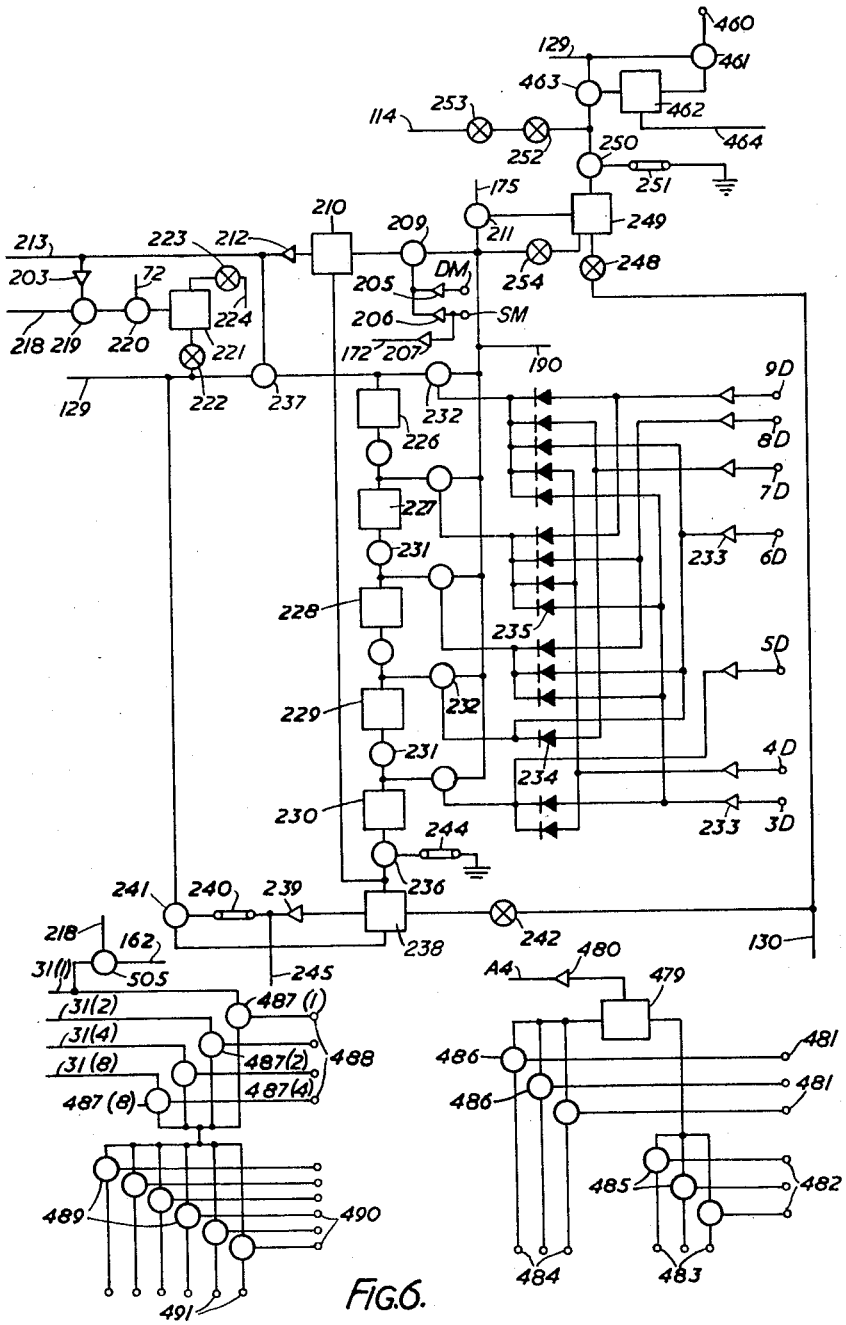

The line 172, which is controlled by the sockets ST and D10S, (Figure 5) is also controlled by the socket SM (Sterling Multiply), through a cathode follower 207 (Figure 6).

The multiply trigger 210 may be left "on" for a number of minor cycles which ensures that the largest possible multiplier, which can be contained by the store, has undergone a sufficient number of halving operations to ensure that it is reduced to zero. However, if it is known that the multiplier value in a particular problem will never exceed five digits, for example, considerable calculating time can be saved by reducing the number of minor cycles to that necessary to ensure that the largest five digit value can be reduced to zero. The minimum number of minor cycles necessary for multipliers having from three to nine digits is shown below.

| Multiplier: | Number of minor cycles |
|---|---|
| 3 digits | 9 |
| 4 digits | 13 |
| 5 digits | 16 |
| 6 digits | 19 |
| 7 digits | 23 |
| 8 digits | 26 |
| 9 digits | 29 |

The method employed for controlling the number of multiplying cycles is substantially the same as that employed for controlling the number of cycles of division by ten. Since a maximum of twenty-nine minor cycles is required, it is necessary to employ a five stage binary counter consisting of trigger stages 226, 227, 228, 229 and 230. Each of the counting triggers is coupled to the next by an inverter 231 which is connected to the anode of the right hand grid of the trigger of lower significance and to the grids in common of both the tubes of the trigger of higher significance.

A group of sockets 3D to 9D is provided, to control the number of minor cycles for multipliers having from three to nine digits. Each of the sockets 3D to 9D controls one or more of five gates 232, through cathode followers 233. Isolating rectifiers 234 are used where necessary. Each of these gates is associated with one of the counting triggers so that an output pulse from the gate switches the associated trigger "on."

The same pulse which switches "on" the multiply trigger 210 is fed in common to the five gates 232, so that one or more of the counting triggers will be switched "on" depending upon which of the sockets 3D to 9D is connected to the programme step. For example, suppose that the socket 4D is connected to the programme step, then three of the gates 232 will allow a pulse to be fed to the counting triggers 226, 227 and 230. This will set up an initial count of nineteen. Since the counter has five stages a carry will occur from the last trigger 230 when the total count is thirty two, that is, when a further thirteen pulses have been fed to the counter. One pulse for each minor cycle is fed to the first counting trigger 226 from the line 129, through a gate 237, which is controlled by the line 213. The pulses on the line 129 occur at the end of each minor cycle, so that a carry will occur from the trigger 230 at the end of thirteen minor cycles, which is the minimum number of cycles necessary for multiplication with a four digit multiplier.

The carry pulse from the trigger 230 is fed to a gate 236 which is held open by a normally closed switch 244. The output pulse from the gate 236 is fed to the multiply trigger 210 to switch it "off," and also to the grid of the left hand tube of a trigger 238 to switch it "on." The high anode i.e. the anode of the left hand tube of the trigger 238 feeds a cathode follower 239 to raise the voltage of a line 245. The line 245 raises the voltage of the control lines D2 and M2 through cathode followers 246 and 247 (Figure 5). This allows trains of shifting pulses to be applied to both the multiplier and multiplicand stores. However, the other gates in the arithmetic unit are now closed, since the multiply trigger 210 has been reset. This clears both the stores.

The cathode follower 239 also controls a gate 241 through a normally closed switch 240. At the end of the minor cycle in which the stores are cleared, a pulse from the line 129 is passed by the gate 241 to the grid of the right hand tube of trigger 238 to switch "off" the trigger 238. In switching "off," the trigger 238 produces a pulse on the anode of its left hand tube and the pulse is fed by an inverter 242 to the line 130, to indicate that the multiplying and clearing operation is complete.

21. *Control unit—operation complete*

Stepping of the programme timer register 80 (Figure 3) takes place under control of an operation complete trigger 249 (Figure 6). It has already been explained that a pulse will be fed to the line 130 at the end of the last minor cycle of a multiplication, a division by ten, an addition, or a subtraction operation. This pulse passes to an inverter 248, the output from which switches "off" the operation complete trigger 249. In switching "off," this trigger produces an output pulse which is fed through a gate 250 which is held open by a normally closed switch 251. The output from the gate 250 drives two cascaded inverters 252 and 253, to produce an output pulse on the line 114, which is the shifting pulse line common to all the stages of the programme timer 80. Consequently, the programme timer is stepped along to make the next programme step effective.

At the beginning of the next minor cycle, a pulse is fed from the stage 81(1) of the primary timer, via the line 175, the gate 211, and the inverter 254, to the trigger 249, to switch it "on" again. The high anode of the trigger 249 controls the gate 211, so that only one pulse can be fed to the multiply trigger 210, and the counters which control the number of minor cycles for multiplication and division by ten, irrespective of the number of minor cycles which are required for those operations. The trigger 249 remains "on," until a pulse on the line 130 indicates that the operation plugged up for that particular programme step has been completed. The trigger 249 will then be switched "off" producing an impulse to cause the programme timer to shift to the next programme step, and so on.

22. *Adder circuit*

To facilitate the understanding of the complementing circuit and the adding unit, it is desirable to consider first the mode of operation of the basic circuit used for adding two code components. This circuit is equivalent to a two input binary adder.

Figure 12:
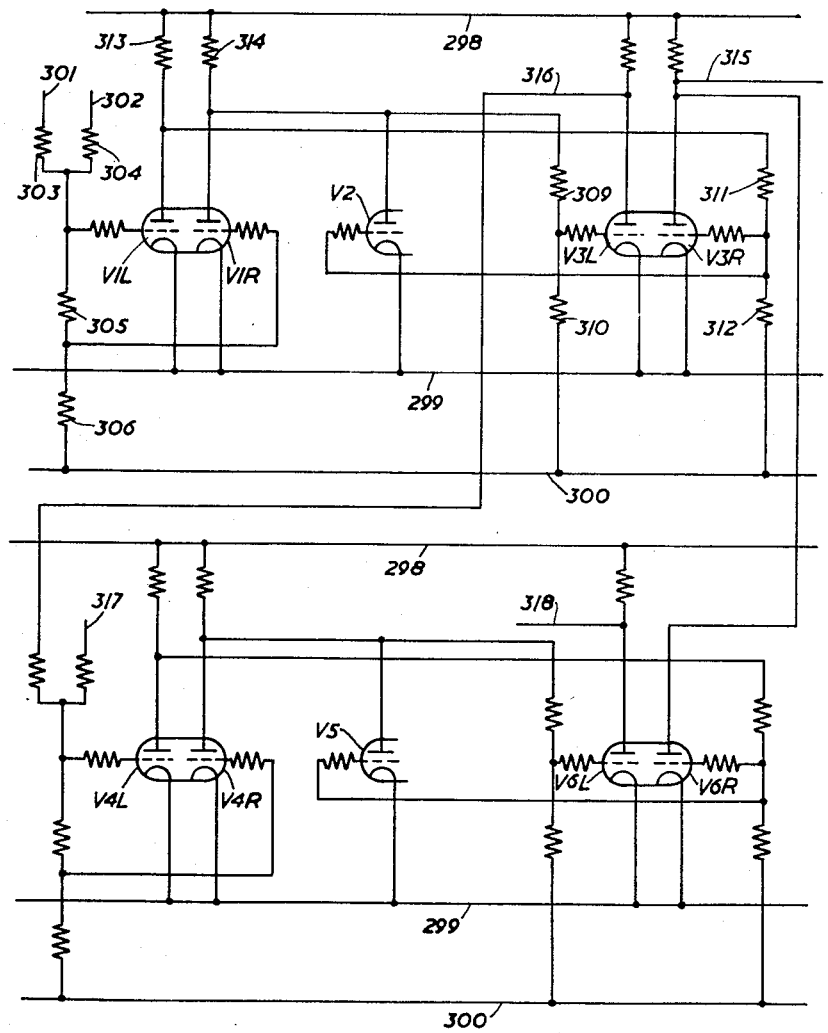
Figure 12 is a circuit diagram of an adder.

The two inputs are applied to the adder on lines 301 and 302 (Figure 12). The input convention adopted is that for a zero (no code component), the input line is positive and that for a one (code component present), the input line is negative. The terms positive and negative are used in the same sense as in the case of a control voltage. The two input lines 301 and 302 are connected, through resistors 303 and 304, to resistors 305, and 306 in series, to a negative bias line 300.

The grid of a triode V1L is connected to the junction of the resistors 303 and 304, and the resistor 305, and the grid of a triode V1R is connected to the junction of the resistors 305 and 306.

When the two inputs are zero, both the lines 301 and 302 are positive, and the grids of V1L and V1R are held above cut-off. These two valves draw current through anode resistors 313 and 314 respectively, so that their anodes are low.

The anode of V1R is connected through resistors 309 and 310 to the bias line 300. With V1R conducting, an inverter triode V3L, the grid of which is connected to the junction of the resistors 309 and 310, is held non-conducting. The anode of V3L is therefore at the voltage of positive supply line 298. The voltage of a line 316, connected to the anode of V3L indicates the sum digit, which is zero, since the voltage is high.

In a similar way, the anode voltage of V1L controls conduction in a triode V3R, the grid of which is connected to the junction of resistors 311 and 312, which are connected between the anode of V1L and the line 300. Since V1L is conducting a line 315 connected to the anode of V3R will be indicating a carry digit of zero.

If the input is one and zero, one of the lines 301 and 302 will be positive and the other will be negative. The grid of V1L is still held above cut-off, so that the line 315 will still indicate a carry digit of zero. However, the grid of V1R will fall below cut-off. The increase in anode voltage of V1R allows V3L to conduct, and the line 316 becomes negative to indicate a sum digit of one.

If the input is one and one, both the lines 301 and 302 will be negative and both V1L and V1R will be cut-off. The high anode voltage of V1L allows V3R to conduct and the line 315 falls negative to indicate a carry digit of one.

The grid of a triode V2 is also connected to the junction of the resistors 311 and 312, so that V2 is conducting when V1L is non-conducting and vice versa. The anode of V2 is connected to the anode of V1R, so that when V1L is non-conducting, V3L is also held non-conducting, due to conduction in V2. Thus the line 316 remains positive, indicating a sum digit of zero.

It will be appreciated that the valves V3L and V3R function solely as inverters; the sum and carry digits are available at the anodes of V1R and V1L respectively, but the digit convention is reversed. The inverters enable two or more two-input adders to be coupled in cascade.

The usual requirement is for a three input adder, to deal with the sum of two components and a carry from a previous adder. This is met by connecting the sum line 316 to form one input of a second two input adder. The carry from a preceding stage is connected to a line 317, which is the second input line. These two inputs control valves V4L and V4R, to form sum and carry representing voltages, which are inverted by valves V6L and V6R. A line 318 connected to the anode of V6L assumes a voltage representing the sum of the three inputs. The anode of V6R is connected to the anode V3R, since, at most, only one of these two valves can be conductive for any combination of three inputs. Hence the line 315 assumes a voltage representing the carry digit derived from the three inputs.

23. *Complementing circuit*

It was noted in Section 6 that, when the line A7 (Figures 1, 5 and 7) is negative, the gates 44 are open and the digit represented by the setting of the trigger 40 is fed directly to the adding unit 29. The output from a gate 44 is positive except when both inputs are negative. Since the adder (Figure 12) operates on a negative voltage for a significant input, the input of each gate 44 is taken from the low anode of the corresponding trigger 40.

In order to perform subtraction, the complement of the digit represented by the setting of the triggers 40 is fed to the adding unit 29. Since the digits are coded effectively in a scale of sixteen, the complement to ten is not obtained directly by reading the inverse of the code components and additionally, complements to other scales are required for sterling calculations.

The method of forming the complement is based on the fact that if the code components of a digit are inverted, that is a "zero" is changed to a "one" and vice versa, the resulting digit is the complement to fifteen of the original digits. However, the complement is required to nine for a decimal digit or eleven for a pence digit. The correct complement is obtained by adding the base of the scale of notation to the complement of the digit to fifteen and ignoring any carry which may occur. For example, the complement of seven to fifteen is eight and the addition of ten gives the complement to nine as two, with a non-significant carry. In fact, the "filler digit," that is, the difference between sixteen and the scale of notation, is fed to the complement circuit and the circuit itself converts this to the equivalent of adding ten for decimal, twelve for duo-decimal, etc.

When the line A7 is positive, the gates 44 are closed and gates 43(1), 43(2) and 43(4) are opened. The input to the gate 43(1) is taken from the high anode, i.e. the anode of the left hand tube, of the trigger 40(1) the gate 44(1) being connected to the anode of the right hand tube and the input from inverter 39 (see Figure 1) being connected to the grid of the left hand tube. Hence the output from the gate 43(1) will be a "zero" for a "one" setting and vice versa.

The high anode of the trigger 40(2) drives an inverter 320, which feeds a two input adder 321, which is indicated in block form by a semi-circle. The sum output from the adder is connected directly to the gate 43(2), without the use of an inverter stage corresponding to V3L (Figure 12). The carry output is inverted, by a stage corresponding to V3R (Figure 12), and fed to a further two input adder 323. The other input to the adder 321 comes from a line 322 which is negative, except when the triggers 40 are registering a pence value. This represents the entry of a "2 filler digit," except for the pence. Since the sum output of the adder 321 is not inverted, the output from the gate 43(2) will be as follows:

(1) Sum digit "one" for both inputs "zero."
(2) Sum digit "zero" for one input "zero" and one input "one."
(3) Sum digit "one" for both digits "one."

For condition (3), there will also be a carry of "one" fed to the adder 323.

The second input to the adder 323 comes from the low anode of the trigger 40(4), through an inverter 324. Thus, if the trigger 40(4) is registering "zero," the adder 323 will receive an input of "one," which is equivalent to adding four to the entered digit. The high anode of the trigger 40(4) drives an inverter 325. The output from this inverter, which will be negative for a "zero" setting of the trigger and positive for a "one" setting, is fed to a further inverter 326. The output from the inverter 326 drives the "8" value input line of the adding unit 29. Thus a "one" setting of the trigger 40(4) is made equivalent to a corresponding setting of the trigger 40(8), so that four is added to the entered digit for either setting of the trigger 40(4).

The inverter 326 is driven from four other sources. Firstly, it is connected to the high anode of the trigger 40(8) through an inverter 327. For the tens of shillings denominations, an additional filler digit of eight is required, and this is provided under control of a line 328, which is positive except when the tens of shillings are registered by the triggers 40.

The carry output from the adder 323 is inverted in the usual manner, and connected to the inverter 326. Finally, the output of the inverter 45 feeds an inverter 329, the output of which also drives the inverter 326.

The inverter 329 prevents a complementary read out on the "8" value line, when the complementing circuit is set for a true read out. Under these conditions, the output from the inverter is negative and this maintains the anode of the inverter 326 high, irrespective of the voltages on the other input lines. In other words, a negative voltage overrides the effect of a positive voltage from any other input line.

When the circuit is set for complementary read out, the high voltage from the inverter 329 may be overridden by a low voltage on any of the other input lines. The operation of the circuit is such that only one of the input lines to the inverter 326 can assume a low voltage for any particular set of conditions.

As an example, the operation of the circuit will be considered for complementing the decimal digit six. The trigger 40(1) and 40(8) will be registering "zero" and the triggers 40(2) and 40(4) will be registering "one." The gate 43(1) will give a "one" output, since it is driven from the high anode of the trigger 40(1).

The adder 321 receives a "one" input from the line 322, and also from the trigger 40(2), since the high anode of the trigger is connected to the adder through the inverter 320. This produces a carry output of "one," and also a sum output of "one," since there is no inverter for the sum output line, that is, a value of two is fed to the adding unit.

The adder 323 receives a "one" input from the adder 321 and a "zero" input from the trigger 40(4). Consequently, there is a "zero" carry and a "zero" sum output, as this adder is also without a sum inverter.

The inverter 326 is fed with a low voltage from the trigger 40(4) and with a high voltage from the other driving sources. The low voltage overrides the high voltage, to produce a high voltage at the output of the inverter 326, representing zero.

Thus the complementing circuit reads out the digit three to the adding unit. Although the operation of the circuit has been described sequentially, the voltages representing the complement value of three will appear on the output lines almost as soon as the true value is set up on the triggers 40, since all the circuits are D.C. coupled. The speed of response is limited by finite rise time of the individual circuits due to stray capacities.

24. *Adding unit*

Figures 7, 11:
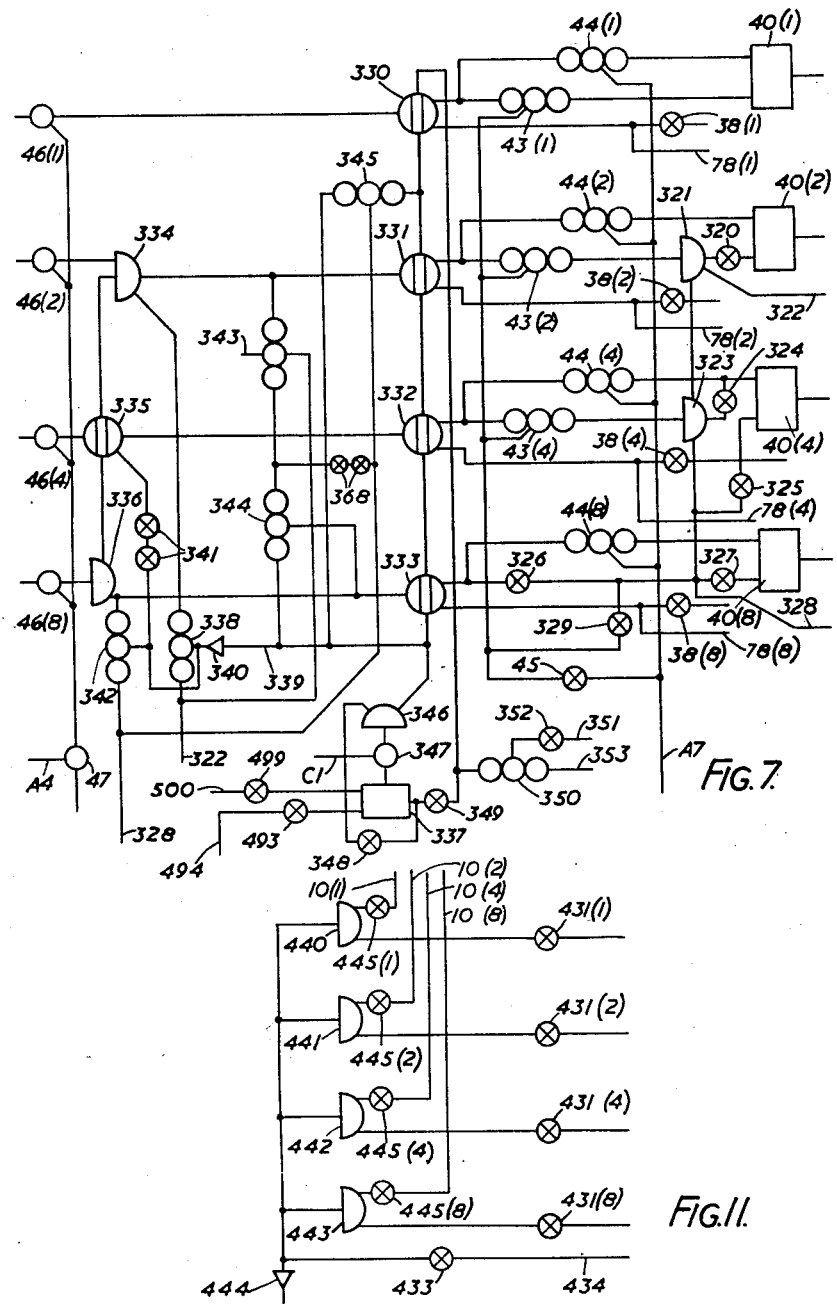
Figure 7 is a block diagram of the adding unit and complementing circuit.
Figure 11 is a block diagram of the read out coincidence circuit.

Since the four possible code components of a digit are fed to the adding unit 29 in parallel, there are four three input adders 330, 331, 332 and 333 (Figure 7). The adder 330 receives one input from the cathode follower 38(1) and a second from the gate 44(1) or the gate 43(1), depending upon whether the value is being entered in true or in complement form. The third input is controlled by a carry storage trigger 337, the setting of which is dependent upon the result of the previous digit addition.

The adders 331, 332 and 333 are similarly connected except that the third input is provided by the carry output of the adder dealing with the next lower code component. As already described, the complement output from the "8" value code component is provided by the inverter 326.

Since the individual adders operate in binary, the output from the four adders is in a scale of sixteen, that is, the sum of six and six is formed as twelve, not as a sum result of two and a carry, if the entry is in decimal. The necessary correction is effected by two input adders 334 and 336, and a three input adder 335. The occurrence of a result inconsistent with the scale of notation is detected, and controls the setting of the carry storage trigger and the addition of an appropriate "filler digit." The occurrence of a carry from the adder 333 will also cause addition of a "filler digit."

Since there is no correction to the "1" code component, the output from the adder 330 controls the gate 46(1) directly. This gate requires a positive voltage to operate, so that the inverter on the sum output is omitted.

The sum output from the adder 331 is fed to the adder 334, which may also receive a "filler digit" of two from a gate 338. The gate 338 is controlled by the line 322, which also controls addition of two in the complementing circuit, and by a carry line 339, through a cathode follower 340. If the lines 322 and 339 are both negative, indicating that the digit being added is not in the duo-decimal scale and that a carry has occurred, the output from the gate 338 will be negative. This causes the addition of the "filler digit" to the sum output of the adder 331. The sum output of the adder 334 controls the gate 46(2), and the carry output is fed to the adder 335.

The adder 335 also receives the sum output from the adder 332, and a "filler digit" of four if the line 339 is negative. The line 339 controls the adder 335, through the cathode follower 340 and two inverters 341 in cascade. The sum output of the adder 335 controls the gate 46(4); the carry output is fed to the adder 336.

The sum output from the adder 333 is fed to the adder 336. A "filler digit" of eight is required only for the scale of two, when the output from the adder 333 can only be "zero." Accordingly, the output of a gate 342, which is controlled by the line 328 and by the cathode follower 340, is commoned with the output of the adder 333. The sum output of the adder 336 controls the gate 46(8). The carry output is not used, since any carry out of the denomination is generated by the adder 333, if the sum of the input digits is greater than fifteen, or by the circuits controlling the addition of the "filler digit."

The sum outputs of the adders 334, 335 and 336 control their respective gates without the use of an inverter, as in the case of the adder 330.

The occurrence of an "8" code component with a "4" and/or a "2," in the sum output of the four main adders, is detected by two gates 343 and 344. The gate 343 is controlled by the sum output of the adder 331 and the line 322. The output will be negative if there is a "2" in the sum and a "filler digit" of two. This output is fed to the gate 344, in common with the sum output from the adder 332, through two inverters 368. The gate 344 is also controlled by the output from the adder 333. The output from this gate, which is connected to the carry line 339, will be negative if there is an "8" in the sum output, and the gate 343 is providing a negative output, or there is a "4" in the sum output. The line 322 is positive for a duo-decimal denomination, so preventing a "2" in the sum from causing a carry.

The occurrence of a "2" code component requires the addition of a "filler digit," when adding in the tens of shillings denomination. A gate 345 is controlled jointly by the carry output from the adder 330 and by the line 328. Hence the output of the gate, which is connected to the line 339, will be negative if a carry occurs and the line 328 is negative.

The carry line 339 is connected to a two input adder 346 which controls setting of the carry storage trigger 337. The other input to the adder comes from the high anode, i.e. the anode of the left hand tube, of the trigger 337, through an inverter 348. The sum output of the adder controls a gate 347, without the use of an inverter, which gate also receives clock pulses on the line C1. The output from the gate is fed to the grids of the carry storage trigger 337.

The adder 346 will produce a positive output if the two inputs are different, that is if the setting of the carry trigger does not agree with the state of the carry line 339. This will allow the gate 347 to feed a clock pulse to the trigger to set it to agree with the carry line. The high or left hand anode of the trigger 337 is also connected to one input of the adder 330, through an inverter 349. Since the read out gates 46 are controlled by the same clock pulses which effect setting of the trigger 337, each setting of the trigger is effective for carry entry in the addition of the denomination next after that which produced the setting.

Figure 3:
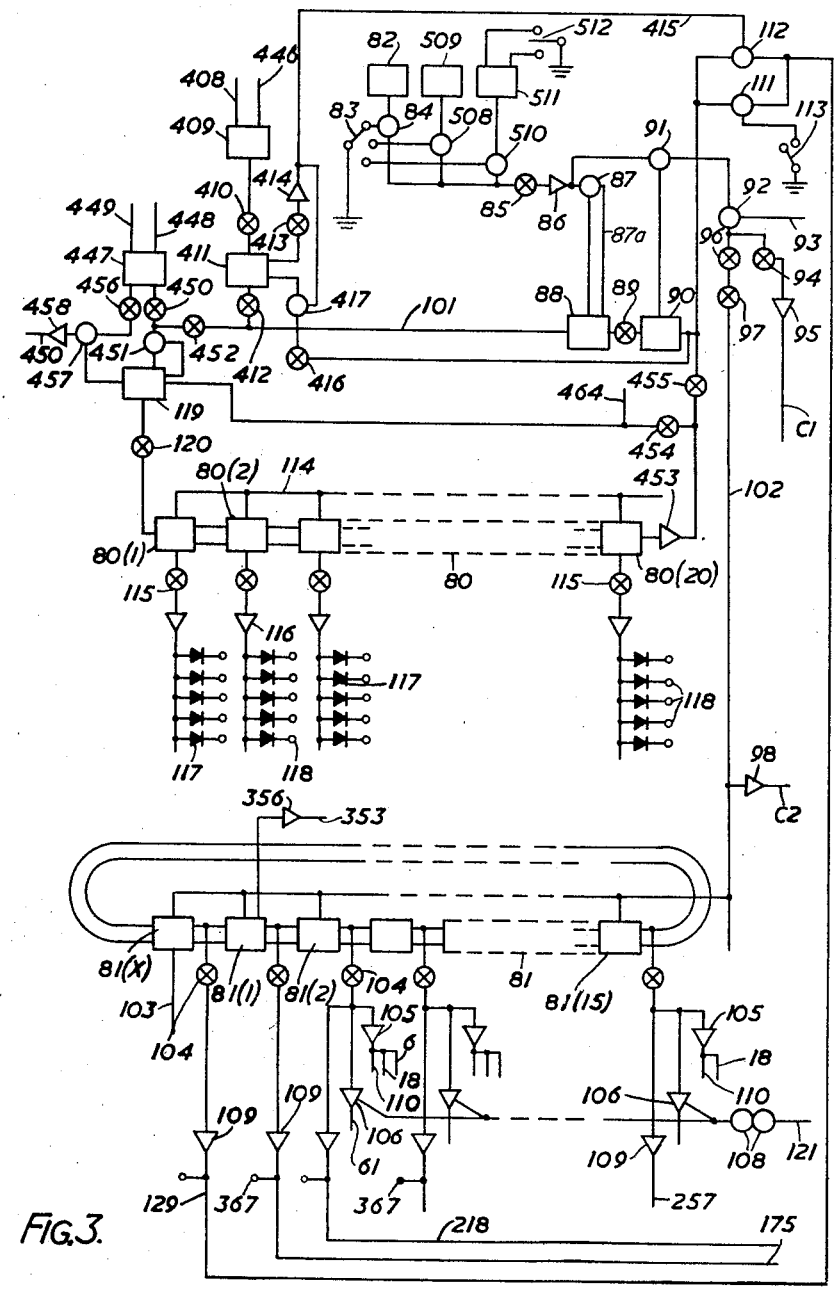

When adding in complement, it is necessary to convert the least significant digit of the number to a complement to ten, in the case of decimal, or to twelve or two for duo-decimal or binary respectively. This is effected by a gate 350, the output of which is commoned with that of the inverter 349. The socket CB controls the gate 350, through the cathode follower 163 (Figure 5), line 351 and inverter 352, the output of which will be negative when the complementing circuit is operative. The other input to the gate is via a line 353, which is controlled from the high anode of the stage 81(1) of the primary timer, through a cathode follower 356 (Figure 3). This stage is "on" only during the addition of the least significant digit, so that during this period both inputs to the gate 350 are negative and the output will be negative, to enter a "one" in the adder 330. Since the least significant digit is being added, the trigger 337 cannot be registering a carry.

25. Control unit—filler digit control

The voltages for controlling entry of the "filler digits" in the adding unit 29 (Figure 1), the complementing circuit 42, and also the doubling circuit 74, are provided by a shifting register of five stages 359(1) to 359(5) (Figure 4) in the control unit. All the stages are normally "off," so that shifting pulses applied on the line 102 are ineffective.

The high anode of the stage 359(3) is connected, through a cathode follower 362, to the line 322, which controls entry of the "filler digit" of two. This normally holds the line 322 negative, and effects entry of the "filler digit." The "filler digit" of four is entered by the circuit itself, when required, thus providing the "filler digit" of six for decimal calculation.

The low anode of the stage 359(5) is connected, through a cathode follower 366, to the line 328. This normally holds the line 328 positive, and prevents entry of the "filler digit" of eight.

The points in the primary timer cycle at which the "filler digit" has to be changed, in a sterling calculation, depend upon the relative position of the pence denomination in the store. To allow for this, the time at which the shifting register 359 is made operative is determined by a plug connection (not shown), which is made from a socket 358 to any one of a series of sockets 367 (Figure 3), which are connected to the output lines of the cathode followers 109.

If the connection is made to the first socket 367, the socket 358 will receive a pulse when the stage 81(1) switches "off." This provides the correct timing for a value in which the lowest digit represents one tenth of a penny. If the connection is made to the next socket 367, the pulse will occur one pulse time later, corresponding to the lowest digit being one hundredth of a penny, and so on for the other sockets 367.

The pulse at the socket 358 is fed to a gate 357, which is also controlled by the socket ST (Sterling Transfer) or D10S (Divide Sterling by ten) via the line 172 (Figures 4 and 5). The output pulse from the gate 357 is fed to the stage 359(1), to switch it "on."

The next clock pulse on the line 102 will switch "off" the stage 359(1) and switch "on" the stage 359(2). The succeeding pulse on the line 102 shifts the "on" setting to the stage 359(3). The inputs to the adding unit 29 are delayed by one denomination in relation to the read out from the stores, as already explained. In consequence, the adding unit is dealing with the pence denomination when the stage 359(3) is "on," provided that the values being added have a tenth of a penny as the lowest digit.

The next clock pulse switches "off" the stage 359(3) and switches "on" the stage 359(4). This allows the normal addition of a "filler digit" of six for the units of shillings denomination. The sixth clock pulse of the cycle switches "on" the stage 359(5). This makes the line 328 negative, through a cathode follower 366, to allow entry of a "filler digit" of fourteen (six plus eight), for the tens of shillings denomination. The seventh clock pulse switches "off" the stage 359(5) and the adding unit reverts to decimal addition for the pounds section of the values being added.

23

If the socket 358 is connected to the second socket 367, the cycle of operation of the shifting register 359 will be delayed by a further pulse relative to the start of the primary timer cycle, so that the "filler digits" will be correct for values having one hundredth of a penny as the lowest value.

The circuit 74 (Figure 2) for doubling the multiplicand may also have to deal with sterling values, so that the same kind of "filler digit" control is required. However, the entries to this circuit are not delayed by one pulse, so that the entry of the "filler digit" of two is controlled by a line 361 (Figure 4), which is connected to the high anode of the stages 359(2) via a cathode follower 360. Similarly, the "filler digit" of eight is controlled by a line 365, which is connected to the high anode of the stage 359(4) via a cathode follower 364.

In order to economise in storage space, it may be desired to temporarily hold two values in a single store. If both these values are sterling, the "filler digit" control cannot be effective for both values. Hence, if the contents of this store were transferred through the adding unit, to another store, the pence denomination of one of the values would be treated as a decimal denomination. This would result in an incorrect transfer if the pence value was either ten or eleven.

To permit a transfer of this type, a plug connection is made to the socket MT (Figure 5). The line 171 from the cathode follower 170, which is controlled by the socket MT, is connected to the line 322. Thus the line 322 is held positive throughout the programme step for which the socket MT is made operative. This suppresses the addition of the "filler digit" of two and allows the transfer to take place correctly. Naturally, this function can only be used for a transfer, and not for an addition, operation.

26. *Doubling circuit*

Since the digits of a value are each expressed in binary coded form, doubling is basically effected by a relative shift of the input and output lines of the circuit. That is, the "1" value input line becomes the "2" value output line, the "2" value input line becomes the "4" value output line, and so on. However, this shift may produce a digit value greater than the scale of notation, so that it is necessary to apply a "filler digit" correction. Thus the doubling circuit comprises a "filler digit" correction circuit similar to that used in the adding unit, with a relative shift of the input lines.

Figure 8:
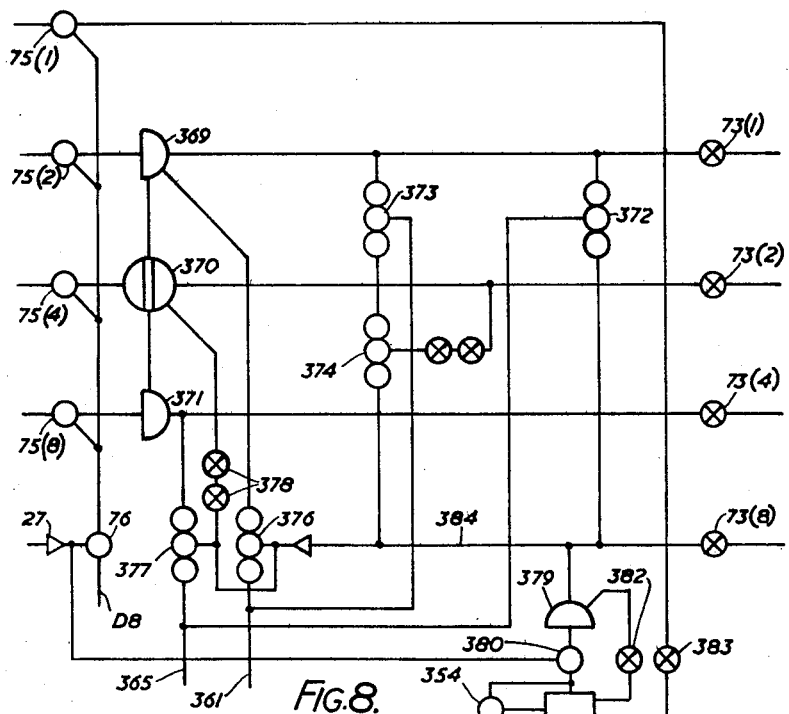
Figure 8 is a block diagram of the doubling circuit.

The inverter 73(1) (Figure 8) provides one input to a two input adder 369, the sum output of which controls the gate 75(2). The other input to the adder is from a gate 376, which is controlled by the line 361 (Figures 4 and 5) for a "filler digit" of two, and by a carry line 384.

The inverter 73(2) feeds a three input adder 370, which controls the gate 75(4). The adder 370 also receives the carry from the adder 369, and a "filler digit" of four by means of inverters 378, which are controlled by the carry line 384.

The inverter 73(4) feeds a two input adder 371, which feeds the gate 75(8). The output of a gate 377, which is controlled by the carry line and by the line 365 for the "filler digit" of eight, is fed to the same input. The other input to the adder is the carry from the adder 370.

The output of the inverter 73(8) is connected to the carry line 384. As in the adding unit 29, the carry line 384 controls an adder 379, which also receives one input from the left hand anode of a carry storage trigger 381, via an inverter 382. The sum output of the adder controls a gate 380, which has pulses applied to it from the cathode follower 27. The output of the gate 380 is connected to the grids of the tubes of the carry storage trigger 381 to set that trigger in accordance with the state of the carry line 384. The low or right hand anode of the trigger 381 controls the gate 75(1) through

24 an inverter 383. A gate 354 is controlled by the high or left hand anode of the trigger 381. A TX pulse (Figure 20), on the line 129, is passed by the gate 354, if the trigger is "on," to reset it ready for the next cycle.

The setting up of a carry, due to the addition of a "filler digit," is effected by gates 373 and 374 for decimal and duo-decimal, and by a gate 372 for the binary scale. The correction operates in exactly the same way as for the adding unit, so that the gates 75 will be conditioned to read out the doubled value, corrected for whichever scale of notation is appropriate.

27. *Halving circuit*

As in the case of the doubling circuit, a relative shift of the input and output performs the basic function. In this case, an "8" value input line becomes a "4" value output line etc. Since a halved value can never exceed half the scale of notation less one, there is no need for "filler digit" correction. However, halving of an odd digit requires that five be added to the next lower denomination. This necessitates determining, when halving each digit, whether the next higher digit is odd or even.

Figure 9:
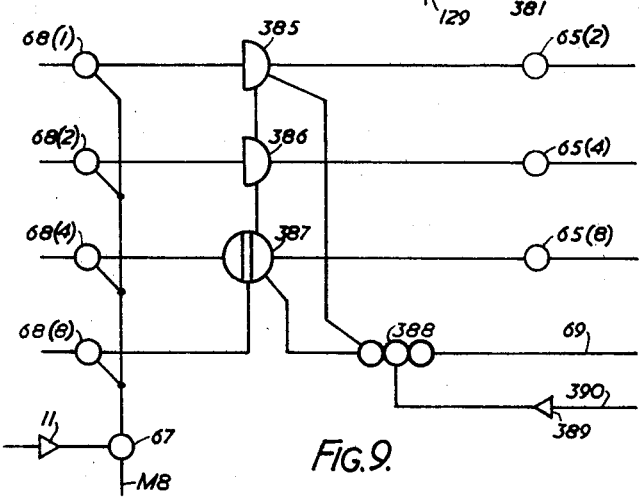
Figure 9 is a block diagram of the halving circuit.

The high anodes of the "2," "4" and "8" value stages in the least significant position of the multiplier register 1 (Figure 2) are connected via inverters 65 (Figures 2 and 9) to one input of adders 385, 386 and 387 respectively. The sum output of these adders control the gates 68(1), 68(2) and 68(4) respectively. Thus in the absence of any other input to the adders, the halved value of a digit will be read out by the gates 68.

A gate 388 is connected by a line 69, to the low anode of the "1" value stage for the next to lowest position of the multiplier register. The gate is also controlled by a cathode follower 389, which is connected to the high anode of the stage 81(9) of the primary timer. Consequently, the output of the gate will be negative if the last but one digit in the multiplier register is odd and the stage 81(9) is "off."

The output of the gate 388 is connected to the adders 385 and 387, so that a negative output causes the addition of five, as one and four, to the digit controlling the inverters 65.

The carry output of the adder 385 is fed to the adder 386; that of the adder 386 is fed to the adder 387, and the carry output of the adder 387 controls the gate 68(8).

In this way, five is added to the halved value of each digit if the next higher digit is odd. It is not necessary to determine whether the lowest digit of a value is odd, since fractions are ignored. The expression "fraction" being used here to mean any value which is smaller than the lowest denomination in the multiplier store, since the position of the decimal point is not fixed in relation to the store.

It is necessary to suppress the addition of five when the highest digit of the multiplier is in the least significant position of the multiplier store. This will be effected under control of the stage 81(9) of the primary timer, which will be "on" at this time. The lowest digit of the multiplier is now in the next to least significant position of the store, and could therefore cause an incorrect addition of five, under control of the line 69, but for the suppression.

28. *Divide by ten circuit*

It was noted in Section 11 that a decimal value in the multiplicand store may be divided by ten, by circulating the value through the adding unit 29 and applying sixteen shifting pulses to the store. The same method is used for a sterling value, but a correction must be applied each time that the scale of notation changes. This correction is effected under control of four gates 391 (Figure 10).

Figure 10:
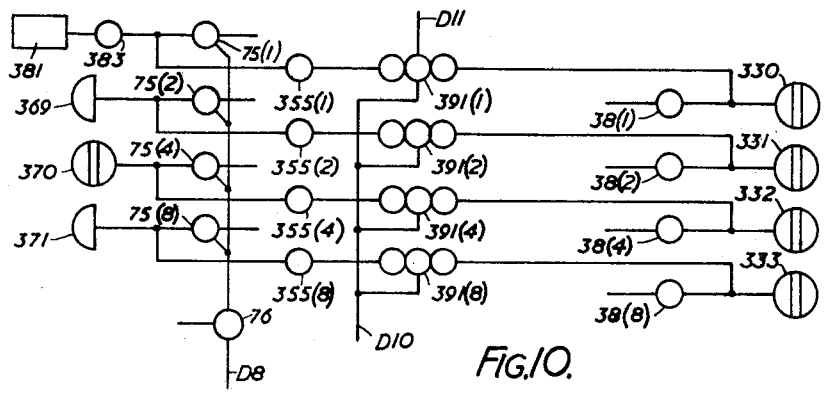
Figure 10 is a block diagram of the divide by ten circuit.

Figure 10 shows the divide by ten correction circuit in relation to the output of the doubling circuit and the input of the adding unit.

The doubling circuit drives four inverters 355, in addition to the gates 75. The inverters 355 feed four gates 391. The gate 391(1) is controlled by the line D11 and the gates 391(2), 391(4) and 391(8) are controlled by the line D10.

The line D10 is negative (Figure 20) when the units of shillings and the units of pounds are in the last section of the store 2. The line D11 is negative one pulse time after the line D10. The line D9 (Figure 2) is positive at all times, except when the units of pounds are in the last section of the store.

All denominations, except the units of pounds, are shifted out of the store on to the highway 31, through the adding unit and back into the store, as for a decimal value.

When the units of shillings are in the last section of the store, the line D10 is negative. This allows the units digit of the doubled value to be fed to the adding unit, to be added to the pence value, which is registered on the triggers 40. The result is fed back to the store, to become tenths of pence.

The next pulse shifts the units of shillings on to the triggers 40. The line D10 is positive to prevent read out of twice the tens of shillings, but the line D11 is negative to allow the carry trigger 381 to enter one in the adder 330, if the trigger is "on."

The units of pounds is doubled and added to the tens of shillings value, under control of the line D10, to form the final shillings value.

The next shift takes place with the gate 26 closed, preventing the units of pounds being registered on the triggers 40. The line D11 is negative to allow entry of any carry from the doubling of the units of pounds. The subsequent shifts then take place in the same way as for a decimal value.

The operation of the circuit will be further illustrated by considering, step by step, the division of the value £1298–19–1.3. At the beginning of the cycle the tenths of pence digit is registered in the last section of the multiplicand store 2.

The read out from the store and the shifting of values in the store are effected by identically timed pulses, but the output voltage of the inverters, which are controlled by the triggers, changes comparatively slowly, due to capacitative loading. Thus the state of a trigger before switching is read out. The table below shows the conditions of the stores after each pulse has ceased and the values have been read out. The pulse timings T1, T2, T3 etc. correspond to pulses from the stages 81(1), 81(2), 81(3) (Figure 20) etc.

| Pulse | Triggers 40 | From Circuit 79 | Last section of store 2 | Trigger 381 | From adding Unit 29 |
|---|---|---|---|---|---|
|     | 0 | 0 | 3 (.1d.) | Off | 0 |
| T1  | 3 | 0 | 1 (d.) | Off | 0 |
| T2  | 1 | 8 | 9 (sh.) | Off | 3 (.01d.) |
| T3  | 9 | 1 | 1 (10sh.) | On | 1+8 (.1d.) |
| T4  | 1 | 6 | 8 (£) | Off | 9+1 (d.) |
| T5  | 0 | 1 | 9 (10£) | On | 1+6 (sh.) |
| T6  | 9 | 0 | 2 (100£) | Off | 1. (10sh.) |
| T7  | 2 | 0 | 1 (1000£) | Off | 9 (£) |
| T8  | 1 | 0 | 0 | Off | 2 (10£) |
| T9  | 0 | 0 | 0 | Off | 1 (100£) |
| T10 | 0 | 0 | 0 | Off | 0 |

Under the heading "From adding unit" are shown the digits which are added, with the denominational value which they have after the remaining six shifting pulses of the cycle have been applied to the register.

The "filler digit" control described in Section 25 is operative during division of a sterling value, to condition the adder to deal with the various scales of notation. In the present case, the sixteenth shift pulse will move the hundredths of pence digit out of the register and this digit will be "0," leaving the value in the register as £129–17–10.9. It will be noted that the position of the various denominations in the register is the same as before the division operation, so that no alteration in the "filler digit" control is necessary in subsequent operations on the contents of the register.

The extra digit could have been retained in the register by entering the value into the register initially as £1298–19–1.30, that is, with all the digits shifted up one place. This would also entail modifying the plug connection to the "filler digit" control.

29. Control unit—division control

The voltages on the lines D9 and D10, for controlling the gates 26 and 78 are derived from the stages of a five stage shifting register 404(1), 404(2), 404(3), 404(4) and 404(5) (Figure 4). The shifting register is made operative by a pulse from a gate 403, which is controlled by a pulse from the socket 358, and the voltage on the line 189 (Figures 4 and 5). The voltage on the line 189 is positive when the sterling divide socket D10 S is plugged to an operative programme step.

The high anode of the stages 404(2) and 404(4) are connected, via cathode followers 405 and 406 and an inverter 400, to the line D10. For the case of tenths of pence being the lowest denomination, the socket 356 is plugged for a T1 pulse, so that the line D10 is negative for read out by the T3 and T5 pulses.

The high anode of the stage 404(4) is connected via an inverter 396 and a cathode follower 407 to the line D9, which is therefore held positive except when this stage is switched "on." This occurs for read out by a T5 pulse.

The high anodes of the stages 404(3) and 404(5) are connected, via cathode followers 391 and 392 and an inverter 401, to the line D11. This makes the line D11 negative for read out by the T4 and T6 pulses.

30. Control unit—read in

For each index point of a card being read, a set of scanning pulses must be applied to the capacitor stores 5 and 17 (Figure 2), for the multiplier and multiplicand respectively. In addition the appropriate gates are opened to enable the values to be tranferred from the capacitor stores to the main stores. The time occupied by one cycle of the primary timer 81, is small compared with that for sensing an index point of a card. This allows a primary timer cycle to be called under control of contacts operated by a cam on the punch. The timing of the cam is such that the primary timer cycle occurs near the end of each index point sensing.

At each index point, from "9" to "Y" (Figure 19), a pair of cam contacts are closed twice to lower the voltage on a line 408 (Figure 3) connected to the grid of the left hand tube of a trigger 40 and thereby to switch "on" that trigger 409. The pulse produced on the anode of the left hand tube of trigger 409 is fed, via an inverter 410, to a trigger 411 to switch it "on." In switching "on," the trigger 411 pulses an inverter 412. The output pulse of the inverter is applied to the grid of the left hand tube of trigger 88, via the line 101, to switch it "on." This causes the trigger 90 to be switched "on" and allows clock pulses to be fed to the various parts of the machine (Section 14).

The low anode of the trigger 411 controls an inverter 413. This inverter drives a cathode follower 414. An output line 415, of the cathode follower, will be positive when the trigger 411 is "on." The line 415 controls the gate 112, which receives a TX pulse from the primary timer. The primary timer starts the read in operation with the stage 81(1) "on," so that it completes one cycle before a pulse is applied to the gate 112, via the line 129, the output of which is connected to the grid of the right hand tube of trigger 90 and which switches "off" that trigger 90 and prevents the emission of further clock pulses through the gate 91. The pulse from the gate 112 is also fed to an inverter 416. This drives a gate 417, which is controlled by the line 415, and the output of the gate switches "off" the trigger 411.

The trigger 409 is switched "off" at the end of each index point by cam operated contacts pulsing a line 446. At the next index point, the trigger 409 will be switched "on" again, to cause another cycle of the primary timer, and so on for the remaining index points.

When the line 415 is positive, it opens the gates 8 and 20 (Figure 2) to allow the scan pulses to read the digits from the stores 5 and 17 into the multiplier and multiplicand registers. In addition it makes the lines M2 and D2 (Figures 2 and 5) positive, through cathode followers 422 and 421, to allow shifting pulses to be applied to the registers. Through cathode followers 419 and 420, it makes the lines D7 and M7 positive, to allow the value in the register to be circulated. Finally, it makes the lines P2 and P7 positive, through cathode followers 423 and 418, to allow the value in the product register 3 (Figure 1) to be circulated.

The brushes are sensing the holes in a card only at a time corresponding to the second operative period, for each index point, of the trigger 409, so that read in occurs at this time.

31. *Arithmetic unit—read out*

The inverters 431(1), 431(2), 431(4) and 431(8) (Figures 1 and 11), are controlled, through cathode followers 430, by the low anodes of the least significant stages of the product store 3. Hence the output from the inverters is low when a register stage is "off" and high when the stage is "on."

The outputs from the inverters 431 are fed to four adders 440, 441, 442 and 443, which act as coincidence circuits. The other input to each adder is from one of the lines 10(1), 10(2), 10(4) and 10(8), through inverters 445. The sum outputs of all the adders are commoned and fed to the tetrodes 435 by a cathode follower 444.

If the cams controlling the lines 10 are at the "7" index point, then the lines 10(1), 10(2) and 10(4) will be positive. If the lowest digit in the store is also seven, then the output from the inverters 431(1), 431(2) and 431(4) will be also positive. This is the equivalent to two "zero" inputs to the adders, so that the sum outputs will also be positive.

The adder 443 will receive two negative inputs, which will again produce a positive sum output. Thus all four outputs are positive, and the cathode follower 444 will raise one grid of each of the tetrodes 435 above cut-off, subject to the control by the inverter 433 (Section 12).

If the digit in the store is not the same as the digit represented by the lines 10, then one or more of the adders 440, 441, 442 and 443 will receive one negative and one positive input. This results in a negative sum output and prevents the grids of the tetrodes rising.

It was noted in Section 30, that the product value is circulated at each index point of a read in cycle, under control of the trigger 411 (Figure 3). Hence as the digits, such as seven, of a value being read in are set up on the stores 5 and 17, the corresponding digits of the product value may be set up on the tetrodes 435. The inverter 433 controls whether the tetrodes can be set up, and therefore whether the value in the product store is punched into a card during a read in cycle.

The anode circuit of all the tetrodes 435 is broken at each index point by contacts controlled by cams on the punch, to de-ionise them before each circulation of the value in the product store. These contacts are open during the calculation period, to prevent circulation of the product value causing undesired operation of the tetrodes. The anode circuit of the tetrodes is closed when the trigger 409 is operated for the first time at each index point.

32. *Control unit—calculate control*

It will be apparent from the description of the method of the read in and read out of data, that the calculation must not start until the read in cycle has finished, and must be completed before the next read in cycle starts.

Figure 19:
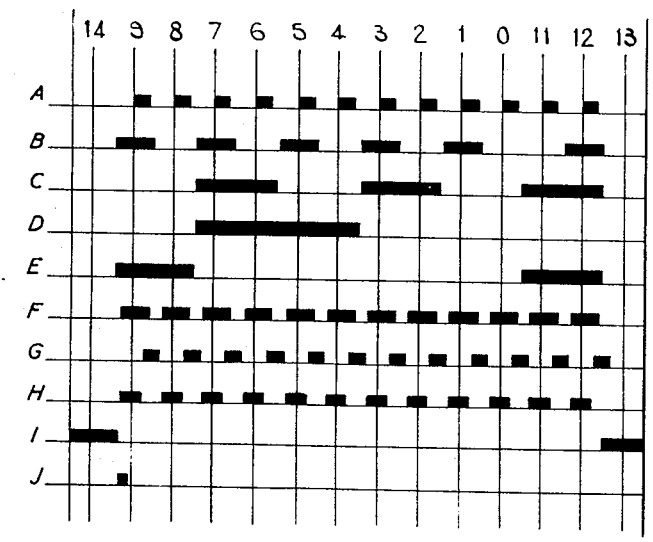
Figure 19 is a card timing diagram.

A trigger 447 (Figure 3) is switched "on" and "off" by cam controlled pulses on lines 449 and 448 respectively. The pulses on the lines 448 and 449 occur after the end of, and before the beginning of, a read in cycle, respectively (Figure 19).

When the trigger 447 switches "on," inverted 450 and 452 feed a pulse to the trigger 88 to switch it "on." This will result in the trigger 90 switching "on" to allow clock pulses to be fed to the machine.

The pulse from the inverter 450 is also fed to a gate 451, which is controlled by the low or right hand anode of the calculate start trigger 119. The pulse from the gate 451 is applied to the grid of the left hand tube of trigger 119 and switches "on" the trigger 119. This produces a pulse to switch "on" the first stage 80(1) of the programme timer, through the inverter 120. The arithmetic unit will now begin the calculation called for by the first programme step.

At the completion of the programme, the last stage 80(20) will switch "off." The resulting pulse is fed through a cathode follower 453 and an inverter 454 to the grid of the right hand tube trigger 119, to switch it "off." The same pulse is fed to the grid of the right hand tube of trigger 90, through an inverter 455, to switch it "off." This returns the control unit to the same condition as that before the calculation started, except for the triggers 447, which will be switched "off" by a pulse on the line 448.

Each programme step may call any number of minor cycles from one to twenty-nine. To take an extreme case, if all the steps called for a full length multiplication, there would be five hundred and eighty minor cycles. This would exceed the time allowed for calculation.

When the trigger 447 switches "off," it pulses a gate 457, through an inverter 456. The gate 457 is controlled by the high or left hand anode of the trigger 119. If the programme timer has not reset the trigger 119 before the trigger 447 is reset, the gate 457 will be open to feed a pulse to a cathode follower 458. The cathode follower drives a line 459, which controls energisation of an unfinished programme relay. Contacts of this relay may be used to break the running circuit of the punch, to indicate that the calculation was not properly completed.

The programme timer must complete the cycle of twenty steps in order to reset the trigger 119, even though the particular calculation may be carried out by using only six steps, for example. A shifting pulse for the programme timer is normally produced by an operation complete pulse on the line 130. If the unwanted steps of the programme are not plugged, there will be no operation complete pulses to step the programme timer.

To avoid this condition, the first unwanted programme step is plugged to a socket 460 (Figure 6). A TX pulse on the line 129 is passed by the gate 461 connected to the left hand grid of a trigger 462, to switch "on" that trigger 462. The high or left hand anode of the trigger 462 controls a gate 463. On the next minor cycle, the gate 463 will pass a TX pulse to the inverters 252 and 253, which feed the shift pulse line 114 for the programme timer.

On each minor cycle, the programme timer will shift one step. When the stage 80(20) switches "off," a pulse is fed from the inverter 454, via a line 464 (Figures 3 and 6) to reset the triggers 462 and 119, line 464 being connected to the right hand grid of trigger 462.

33. *Control unit—cancel programme*

Facilities are provided for cancelling a plugged programme, if certain conditions arise, either in the cards which are sensed, or in the course of a calculation. This is effected by the cancel trigger 263 (Figure 4) which cuts off the supply of shift pulses to the stores and the adding unit (Section 20), so that, although the programme timer 80 goes through a programme step, no calculation takes place.

It may be desired to suppress a programme step if the previous steps have produced a complementary value in the product store. In order to detect a complement, the actual product value must be limited to a maximum of thirteen digits. The most significant position in the store will then contain zero or nine, if the value is in true or complement, respectively. It is then sufficient to determine whether the stage 3(8) in the highest position is "off" or "on."

The high anode of this stage is connected, via a cathode follower 428 (Figure 1) and a line 427 (Figures 1 and 4), to a gate 426 and an inverter 429. A gate 425 is controlled by the voltage applied to a plug socket 424 and by T1 pulses on the line 175. The gate 425 feeds the gate 426.

If the socket 424 is connected to the socket 118 of an operative programme step, the T1 pulse at the beginning of the step will be fed to the gate 426. If the product value is also in complement, the gate 426 will provide a pulse to switch "on" the cancel trigger 263, the grid of the right hand tube of which is connected to the output of gate 426.

The programme cancel trigger may be operated if the product value is in true, by plugging the programme step to a socket 465. A T1 pulse will now be fed through a gate 466, controlled by the socket 465, to a gate 467. This gate is controlled by the inverter 429, and will feed the pulse to the trigger 263.

The same facility is provided for the multiplicand store 2. The highest stage of the register 2(8) is connected to the cancel control circuit through a cathode follower 468 and a line 469 (Figures 2 and 4). The line 464 controls a gate 470 directly, and a gate 471, through an inverter 472. The outputs of these two gates are connected in common to the trigger 263. A gate 474 feeds the gate 470 and is plugged to a programme step for cancellation on a complementary multiplicand. A gate 474 feeds the gate 471 and is plugged to a programme step for cancellation on a true multiplicand.

A gate 478 is controlled by a T1 pulse, and by a socket 475, through a relay contact 476 and a cathode follower 477. The relay contact is controlled by a relay which is energised when a card bearing a particular designation is sensed. By plugging the socket 475 to the appropriate programme step, that programme step is cancelled for designated cards.

The programme cancel trigger 263 is reset at the end of a programme step by an operation complete pulse on the line 130 (Figures 3 and 4). The cancel facility cannot be used on a programme step plugged for division by ten, since the trigger is not switched "on" in time to suppress the pulse on the line CX, which is effective only on division by ten.

34. *Control unit—digit cancellation*

It may be desired to zeroise part only of a register. For example, the lowest digits of a product may be eliminated, in order to obtain a fixed degree of accuracy. This is effected by controlling the gate 47 (Figure 1).

The line A4 is connected, through a cathode follower 480 (Figure 6), to the low anode of a trigger 479. This trigger may be switched "on" by a pulse from any one of three gates 486. A gate is made effective by connecting a socket 484 to the programme step on which the operation is to take place and a socket 481 to the socket 367, of the primary timer, which corresponds to the first digit to be zeroised.

For example, if the first four digits of the product are to be zeroised, the socket 481 is plugged to receive a T2 pulse. This will switch "on" the trigger 479 and make the line A4 negative, to close the gate 47, and thus cut-off the pulses to the gates 46 of the adding unit. If the arithmetic unit gates are opened to allow the product value to be fed to the adding unit and back into the product store, there will be no read out from the adding unit, since it is delayed by one pulse relative to the store.

The trigger 479 is switched "off" by a pulse from any one of three gates 485. These gates are controlled by a connection from a programme step to sockets 483, and a connection to the primary timer from sockets 482.

One of the gates 485 is plugged to the same programme step as the gates 486 and to a T6 pulse. This will switch the trigger 479 "off," open the gate 47, and allow the fifth and subsequent digits to be read back into the product store.

35. *Control unit—digit insertion*

Any desired digit may be fed to the highway 31, under control of four gates 487 (Figure 6). This facility may be used, for example, to add five to a product value to effect rounding off.

The combination of the gates 487 for representing the desired digit, for example, the gates 487(1) and 487(4) for the digit five, are connected to the programme step, via sockets 488.

The same programme step is also plugged to one of a group of sockets 491. The sockets 491 are connected to six gates 489. The selected gate 489 is also plugged to receive a primary timer pulse, coinciding with the position in which the digit is to be inserted, via a socket 490.

Suppose that it is desired to zeroise the last four digits of a product value, as in Section 34, and to provide a rounded off result. Then five must be added to the fourth digit. A T5 pulse is fed to the gate 489, which is controlled by the programme step. The output pulse from the gate is fed to the four gates 487. Since the gates 487(1) and 487(4) are also connected to this programme step, these two gates will pass a pulse at T5 time to the lines 31(1) and 31(4), to add five in the fourth digit position to the product value, which is fed to the adding unit on the highway 30.

36. *Control unit—zero test*

The zero test facility is used for determining whether two values are equal. One value is added, in nines complement form, to the other. If they are equal, the result will be 999 . . . etc. This is checked by adding one to the result and determining whether there is a carry from the highest digit.

If it is desired to check whether the values in the product store and the capacitor store S4 are equal on programme step 13, plug connections are made from this step to the sockets S4 (Figure 5), FPA, DT, TP, and CB9. This allows the values to be read from the stores to the adding unit, and the result to be read back to the product store.

The connection to the socket CB9 makes the line A7 positive, through a cathode follower 506. The gate 350 (Figure 7) is not opened, so that the units digit is not converted to a tens complement.

Programme step 14 is plugged to the sockets FPA, DT and ZT. This causes the result standing in the product store to be fed to the adding unit on the highway 30. The voltage on the line 162 (Figures 5 and 6) opens a gate 505, to allow a T2 pulse on the line 218 to be fed to the line 31(1). This adds "one" in the lowest denomination, which should cause a carry through all the denominations, and leave the carry trigger set after the highest denomination has been added.

A check trigger 495 (Figure 4) is switched "on" by a TX pulse on the line 129 which is connected to the grid of the left hand tube of the trigger. The high or left hand anode of the trigger controls a gate 496. The carry trigger will be switched "off" by a clock pulse at T1 time. A pulse is fed from this trigger, through an inverter 499

(Figure 7) and a line 494, to the gate 496. The pulse is passed by the gate to fire a gas triode 497, which has a check relay (not shown) in the anode circuit. The contacts of this relay are connected in the running circuit of the punch and prevent further card feeding unless the relay is energised. If checking is not required, these relay contacts may be shorted by a switch (not shown).

The trigger 495 is reset, at T1 time, by a pulse from the line 175 to a gate 498, which is controlled by the high or left hand anode of the trigger and the output from which is connected to the grid of the right hand tube of trigger 495.

The high or left hand anode of the carry trigger 337 (Figure 7) controls a gate 50, via an inverter 499 and a line 500. The gate 501 receives a pulse from the right hand anode of the check trigger 495, when it switches "off." If the carry trigger is not "on," the gate 501 will feed the pulse to the left hand grid of a trigger 502 to switch it "on." The inverter 499 provides a delay which allows the circuit to operate, even though the triggers 495 and 337 are reset at the same time.

The high or left hand anode of the trigger 502 controls the gate 92 (Figure 3), via an inverter 503 and the line 93. If the trigger switches "on," the gate 93 is closed to cut off all the clock and shifting pulses. This prevents any operation of the control and arithmetic units in the event of an error, which assists in finding where the fault has occurred. The trigger 502 may be held permanently "off," by closing a switch 507 connected to the right hand grid of trigger 502. This switch may also be used for resetting the trigger if it is operated.

37. Control unit—indicative punching

Four gates 398 (Figure 4) receive pulses from the line 14C. The gates are also controlled from individual plug sockets 397. The output of the gates 328 operate gas triodes 399. Each of the triodes 399 operates a relay (not shown). The contacts of these relays are used to control punching of predetermined designations in a card. The required designation is called by plugging a programme step to the appropriate socket 397.

38. Control unit—test facilities

Various switches are included to allow modification of the normal operation of the calculator, to simplify servicing and testing procedures.

If the switch 83 (Figure 3), is set to the second position, it closes the gate 84 and opens a gate 508. The operating pulses are now derived from a multi-vibrator 509, which is similar to multi-vibrator 82 and which has a repetition frequency which is approximately one fifteenth of that of the multi-vibrator 82.

By putting the switch 83 in the third position, a gate 510 is opened. The gate 510 is connected to the anode of the left hand tube of a trigger 511 and receives a pulse each time that trigger 511 is switched "on." Switching of the trigger 511 is controlled by a manually operated push button switch 512 connected to the grids of the tubes of the trigger. Each time the switch 512 is operated, the primary timer 81 will be stepped along one stage.

The operation may be halted after a single minor cycle by closing a switch 113. This opens a gate 111, to allow a TX pulse to be fed to the trigger 90 to switch it "off."

The operation may be halted after a single programme step by opening the switch 251 (Figure 6). This closes the gate 250 and prevents a shifting pulse being fed to the programme timer, when an operation complete pulse occurs on the line 130.

Opening the switch 244 (Figure 6) prevents the switching "off" of the multiply trigger 210 at the end of a multiplying cycle, so that the multiplier cycle counter continues to operate. On the other hand, opening the switch 240 allows the trigger 210 to be switched "off," but it does not allow the trigger 238 to be reset to provide an operation complete pulse.

39. Shifting register

Each stage of the shifting register comprises a trigger circuit, such as V7L, V7R (Figure 13), together with a shifting circuit coupling it to the next higher circuit in the chain.

The anodes of V7L and V7R are connected to the +160 volt supply line 298, through resistors 513 and 514, respectively. The anode of V7L is connected, through resistors 515 and 516, to a —93 volt supply line 519. Similarly, the anode of V7R is connected to the line 519, through resistors 517 and 518. The cathodes of V7L and V7R are connected to ground line 299.

The grid of V7L is connected to the junction of resistors 517 and 518, and the grid of V7R is connected to the junction of resistors 515 and 516. When V7L is conducting, the grid of V7R is held at —26 volts, which is more than sufficient to cut it off. The grid of V7L is held at approximately +1 volt. The anode voltages of V7L and V7R are +35 volts and +125 volts under these conditions.

The trigger is switched to the other condition of stability by applying a negative pulse to the conducting grid. The switching characteristics are improved by the connection of a capacitor 520 between the two grids.

Negative shifting pulses of approximately 75 volts amplitude are applied to two diodes 523 and 524, through capacitors 522. The cathodes of the diodes 523 and 524 are connected to the anodes of V7L and V7R, through resistors 528 and 529. The anodes of the diodes are connected to a +50 volt supply line 530, through resistors 527, and to the grids of a succeeding trigger V8L, V8R, through capacitors 525 and 526.

With V7L conducting, the diode 523 has a reverse voltage across it of 75 volts, since the anode of V7R is at +125 volts. The diode 524 is conducting. When a negative shifting pulse is applied, the anode voltage of the diode 524 falls, transmitting a negative pulse to the grid of V8R. If this valve is already cut off, the pulse has no effect; if it is not cut off, then the pulse switches the trigger and leaves it in the same state as V7L, V7R had before the shifting pulse was applied.

The shifting pulse makes the voltage across the diode 523 approximately zero. Thus only a small pulse, or none at all, is fed to the grid of V8L.

The triggers used for control, carry storage, etc., are similar to those used in the registers. Operating pulses are capacitatively coupled to the grids of the valves.

40. Single valve gate

The majority of the gates used are operated by a positive pulse and a positive control voltage. Examples of this type are the gates 24, 26 and 34 (Figure 2) which control read out of the multiplicand value on to the highway 30, and the gates 91 and 92 (Figure 3), which control the clock pulse supply.

Figure 14:
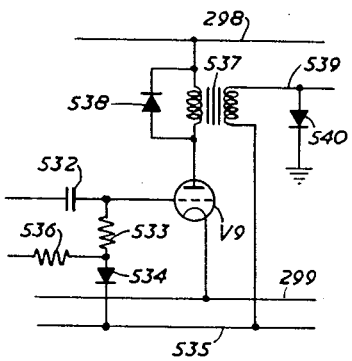
Figure 14 is a circuit diagram of a pulse gate.

Each of these gates comprises a single triode, and a typical circuit is shown in Figure 14. The control voltage is applied to the grid of a triode V9 through resistors 536 and 533. The junction of the resistors is connected to a —20 volt supply line 535 through a diode 534. The control voltage is —10 volt or —70 volts, for the relatively postive and negative conditions.

Because of the diode, the grid of V9 is held at either —18 volts or —70 volts. In either case it is cut-off.

If a positive pulse of 20 volts amplitude is fed to the grid through a capacitor 532, the valve will conduct if the control line is at —10 volts, but not if it is at —70 volts. A pulse transformer 537 in the anode circuit provides a positive pulse on a line 539 when V9 conducts. A diode 538, across the primary winding of the transformer, damps out any overshoot. A diode 540, across the secondary winding, limits the amplitude of the output pulse to 20 volts.

Where a negative output pulse is required, the transformer may be replaced by an anode load resistor.

41. Multi-valve gate

Figure 15:
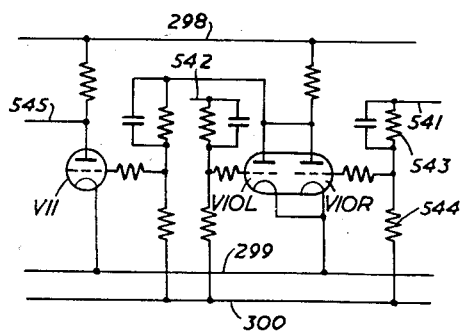
Figure 15 is a circuit diagram of a D.C. gate.

The circuits of a multi-valve gate operating on two negative control voltages is shown in Figure 15. The gates 43 and 44 (Figure 7), for example, are of this type.

The gate consists of three inverters V10L, V10R and V11. One control voltage, on a line 541, is fed to the grid of V10R, through a resistor 543. The grid is also connected to the −310 volt supply line 300, through a resistor 544. The grid is either at +2 volts or −45 volts, depending upon whether the control line is positive or negative.

The other control voltage, on a line 542, is fed to the grid of V10L, by a similar input circuit. V10L and V10R have a common anode load resistor, so that the anode voltage rises appreciably only when both the valves are cut off. This anode voltage is fed to the grid of V11, and the voltage of a line 545, connected to the anode of V11, will drop only when V10L and V10R are both cut off.

The valve V11 is a typical D.C. inverter circuit, corresponding to the inverters 38 and 45 (Figure 1), for example. For pulse inversion, the input potentiometer is connected between the lines 298 and 299. The shunting capacitor is removed, and the pulse input is capacitatively coupled to the grid.

42. Clamping circuit

Figure 16:
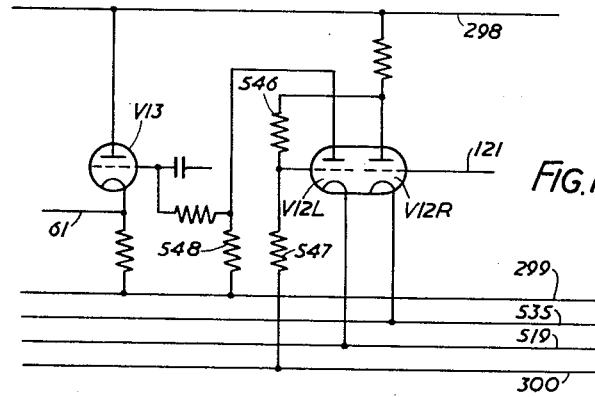
Figure 16 is a circuit diagram of a cathode follower clamping circuit.
Figure 17:
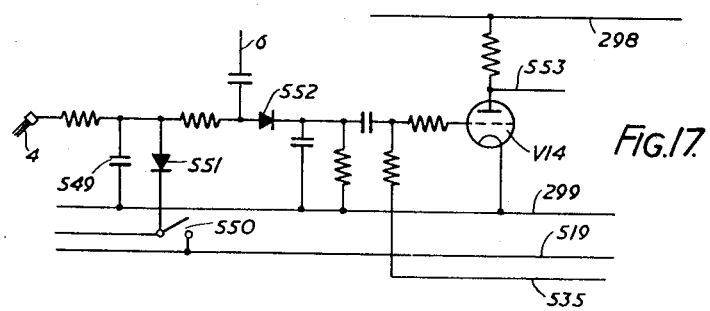
Figure 17 is a circuit diagram of one stage of a capacitor store.

A detailed diagram of the clamping circuit 108 (Figure 3) is shown in Figure 16.

The control voltage, on the line 121, is applied to the grid of a triode V12R, the cathode of which is connected to the −20 volt line 535. The grid of a triode V12L is connected to the junction of resistors 546 and 547, which join the anode of V12R and the −310 volt line 300.

The anode of V12L is connected to the ground line 299, through a resistor 548. The grid of V12R is either at −92 volts or −127 volts, depending upon whether V12L is non-conducting or conducting. The corresponding anode voltages of V12R are −70 volts and 0 volts.

The grids of the cathode followers 106 are connected through resistors to the anode of V12L. V13 (Figure 16) is one such cathode follower.

43. Capacity store

Before each index point is sensed, contacts 550 (Figure 18), which are operated by a cam on the punch, charge a capacitor 549 to −93 volts, through a diode 551.

The contacts 550 then connect the diode 551 to the line 299. If the brush 4 senses a hole in a card, it discharges the capacitor 549. A +50 volt scan pulse is applied on the line 6 at each point. Only if the capacitor 549 is discharged will the pulse be fed to the grid of a normally non-conducting valve V14, via a diode 552. The negative output pulse from V14 is fed to the inverter 7 by a line 553.

The capacitor 549 discharges through the back resistance of the diode 551, but the time constant is sufficiently large to ensure that, if it is not discharged through the brush 4, the voltage at the end of a sensing cycle is still appreciably more than the amplitude of the scan pulse.

The cathodes of the diodes, corresponding to the diode 552, of all the sections of the store 5 are connected to the grid of the amplifier V14. A similar arrangement is used for the store 17.

The stores such as 33 (Figure 1) have four amplifiers, one for each of the sections for the four code components.

44. Sensing and punching

It has already been noted that the input and output mechanism comprises a punch similar to that described in British Patent No. 673,759.

Figure 18:
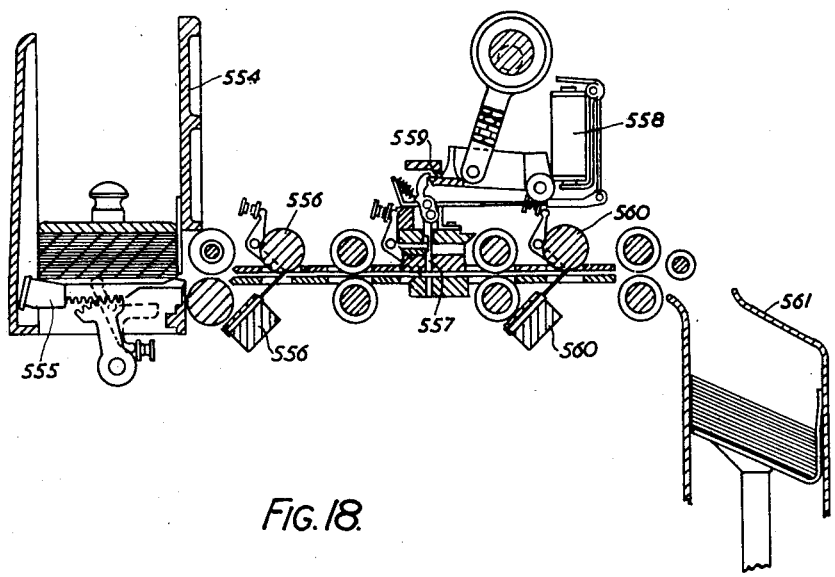
Figure 18 is a schematic diagram of the record card punch.

A schematic diagram of the mechanical construction of the machine is shown in Figure 18. Cards are fed one at a time from a hopper 554, by a conventional picker knife mechanism 555.

A card is sensed at a first sensing station comprising a brush and contact roll assembly 556. The card then passes to a punching station at which data may be recorded in the card by a row of eighty punches 557. The punches are selected for operation by magnets 558, which set an interposer mechanism to cause the punches to be operated by a punch actuating mechanism 559.

The card then passes through a second sensing station comprising a contact roll and brush assembly 560. This station is used only when calculations are to be checked, in a manner to be explained. Finally, the card is deposited in a hopper 561.

A card takes one machine cycle to pass through each of the stations. The electrical interlock circuits for controlling feeding of the cards etc. are substantially the same as those shown in the above-mentioned patent.

45. Card timing diagram

The relative timing of various operations which are controlled by cams on the punch are shown in Figure 19. The machine cycle is divided into fourteen index points. The rows "9" to "0" of a card are sensed at index point times 9 to 0, the rows "X" and "Y" are sensed at times 11 and 12.

Line A of Figure 19 shows the times at which the sensing brushes sense the rows of a card. The same timing applies to the punching of data into a card.

Lines B, C, D and E show the time during which the lines 10(1), 10(2), 10(4) and 10(8) (Figures 1, 2 and 11) respectively, are positive. This allows "X" and "Y" punchings to be read out as ten and eleven respectively.

Line F shows the times during which anode voltage is supplied to the read out tetrodes 435 (Figure 2).

Line G shows the times during which the read in trigger 409 (Figure 3) is "on" for read in. The trigger 411, which actually controls read in is "on" only for a short time at the beginning of each period, as the time for a minor cycle is considerably less than this period.

Line H similarly shows the times during which the trigger 409 is "on" for read out. The capacity stores 5 and 17 are reset a little before each read out time, so that the application of scan pulses to these stores during read out does not produce any false entry in the main stores.

Line I shows the maximum time allowed for calculation, that is, the time for which the trigger 447 is "on."

Line J shows the time at which a reset pulse is applied to the auxiliary stores such as 33 (Figure 1).

46. Electronic timing diagram

Figure 20:
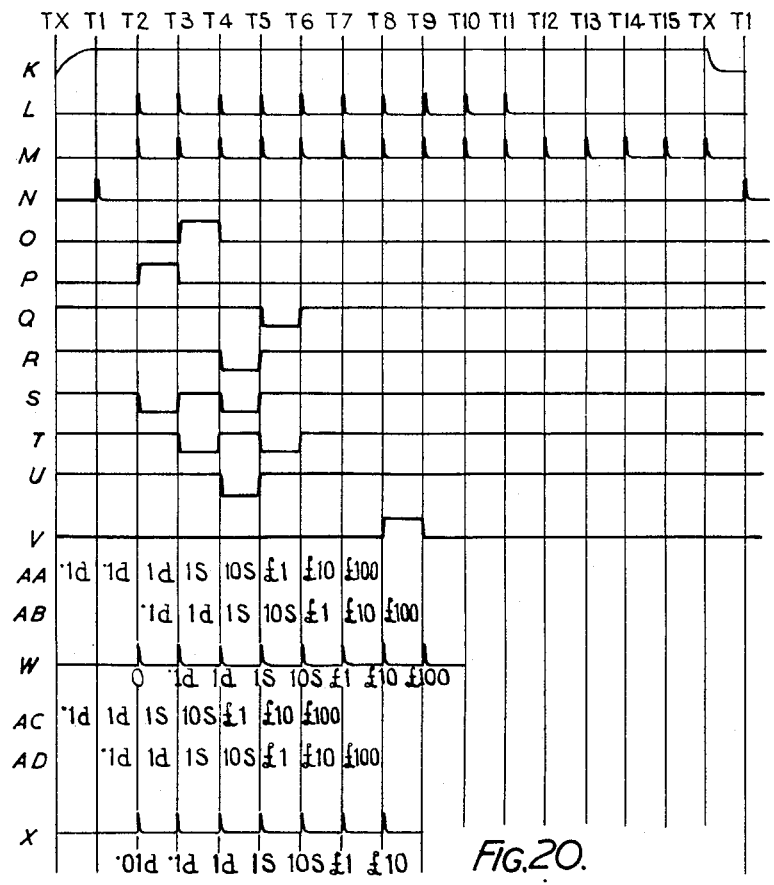
Figure 20 is an electronic pulse timing diagram.

Figure 20 shows the relative timing of some of the more important waveforms in the calculator, together with the position of some denominational values during adding, and during division by ten.

Line K—The control voltage at a socket 118 of a programme step is positive before T1 and remains at this level until TX.
Line L—Pulses on the line 10C (Figure 4)
Line M—Pulses on the line 15C (Figure 4)
Line N— Pulse on the line CX (Figure 4)
Line O—"Filler digit" of two to adding unit, line 322 (Figure 7)
Line P—"Filler digit" of two to doubling circuit, line 361 (Figure 8)
Line Q—"Filler digit" of eight to adding unit, line 328 (Figure 7)
Line R—"Filler digit" of eight to doubling circuit line 365 (Figure 8)
Line S—Control line D10 to allow entry of units digit of doubled shillings, and units of pounds on division by ten
Line T—Control line D11 to allow entry of carry from doubled shillings and units of pounds on division by ten Line U—Control line D9 to suppress read out of units of pounds on division by ten Line V—Line 390 (Figure 9) to prevent entry of .5 on halving the highest multiplier digit Line AA—This shows the value standing in the lowest position of the multiplicand store during addition, assuming the lowest denomination to be one tenth of a penny, as for the waveforms of lines O to U Line AB—This shows the values entered in the adding unit Line W—This shows the values read out from the adding unit Lines AC, AD and X—These show the corresponding conditions for a division by ten. The values in line X are those finally resulting.

47. *Calculation example*

In order to further illustrate the mode of operation of the calculator, the production of cards which may be used for the preparation of invoices by a record card controlled tabulator will be considered.

The data is set out on the cards in the following way:

Columns 3–7 _____ Date.
Columns 8–11_____ Consignee code number.
Columns 12–16_____ Item code number.
Columns 17–19_____ Item quantity.
Columns 20–25_____ Item unit price.
Columns 26–30_____ Freight charge.
Columns 40–49_____ Charge to consignee.

When the cards are placed in the hopper of the punch, columns 3 to 30 will have data punched in them. The net charge is to be found by the calculator and punched in columns 40 to 49. A discount of 3% on the cost of the items is allowed, if this amount exceeds £50. It is also desired to check that the charge to the consignee which is punched in each card is correct.

The usual methods of checking a decimal calculation is to perform the multiplication a second time with the factors reversed, or to divide the product by the multiplicand and to compare the resulting quotient and the multiplier for equality. Neither of these methods are particularly adaptable for use when one of the factors is in a non-uniform notation. The methods proposed heretofore have checked only whether the calculation was correct, and not whether the value actually punched in the card was correct.

In the present machine, the original data and the punched result are sensed at the second sensing station. The item quantity is effectively multiplied by ten, by being entered into the multiplier store 2 one position higher than when it was sensed at the first sensing station. The product is ten times too great and is divided by ten before the freight charge is added. Thus, not only is the data sensed twice at different stations, but the sequence of operations is different, so that the check is extremely effective. As will be seen, the data is also entered into different stores on the two entries, which further increases the chance of finding any error.

For clarity of explanation, it will be assumed that the machine is already in operation and that three cards A, B and C are about to enter the first sensing station, the punching station and the second sensing station, respectively. The data relevant to the calculation is as follows:

|  | Card A | Card B | Card C |
| --- | --- | --- | --- |
| Columns 17–19—Item quantity | 7 | 90 | 24 |
| Columns 20–25—Item unit price | £7–15–7 | £1–10–0 | £17–15–3 |
| Columns 26–30—Freight charge | 5–8d | £1–1–3 | £2–6–0 |

Plug connections are made from the card sensing and punching stations to effect the following operations.

Card A:
    Enter columns 17–19 into store No. 1 (positions one to three).
    Enter columns 20–25 into store No. 2 (positions four to nine).
    Enter columns 26–30 into store No. 3 (positions four to eight).

Card B: Read from positions four to thirteen of the product store to columns 40–49.

Card C:
    Enter columns 17–19 into multiplier store (positions two to four) via temporary store 5.
    Enter columns 20–25 into multiplicand store (positions four to nine) via temporary store 17.
    Enter columns 26–30 into store No. 4 (positions four to eight).
    Enter columns 40–49 into store No. 5 (positions four to thirteen).

Before the calculation starts, the various stores will register the following values:

Product store _____ 0 0 0 0 0 0 0 0 0 0 0 0 0
Multiplicand store ___ 0 0 0 0 0 1 7 1 5 3 0 0 0
Multiplier store _____ 0 0 0 0 0 0 2 4 0
Store No. 1 _____ 0 0 0 0 0 0 0 7
Store No. 2 _____ 0 0 0 0 0 0 1 1 5 7 0 0 0
Store No. 3 _____ 0 0 0 0 0 0 0 0 5 8 0 0 0
Store No. 4 _____ 0 0 0 0 0 0 2 0 6 0 0 0 0
Store No. 5 _____ 0 0 0 0 4 1 5 1 6 3 0 0 0

The calculate trigger 119 will now be switched "on" by the cam controlled contacts, to bring the programme into effect. The positioning of the sterling value in the multiplicand store is equivalent to making the lowest denomination one thousandth of a penny. Accordingly, the socket 358 is plugged to receive T3 pulses. The plug connections from each programme step to the function sockets are shown below.

*Step 1.*—SM (Sterling Multiply), 3D (3 digit multiplier).—This will call ten cycles of halving and doubling and the product £4263–0–0 (240×£17–15–3) will be registered in the product store. The trigger 238 (Figure 6) will provide an operation complete pulse to shift the programme timer to the next step.

*Step 2.*—FPA (from product on highway 30), CB (Complement), a socket 490 (Figure 6), sockets 488 controlling the gates 487(1) and 487(4), socket 491 to a T10 pulse.—This reads out the product value to the adder and subtracts £500, fed in by the digit insertion circuit. This determines whether the true product is greater than £50. TMC.—This allows the result of the subtraction to be fed to the multiplicand store. ST.—This provides the required filler digits and an operation complete pulse. RP.—This retains the product value in the store.

*Step 3.*—FPA, RP, TMC, ST.—This reads the product value into the multiplicand store and retains it in the product store. TMR, socket 490, a socket 491 to a T2 pulse and sockets 488 controlling the gates 487(1) and 487(2) to the programme step.—This reads the digit "3" into the lowest position of the multiplier store. The same digit is also read into the multiplicand store and the product value is read into the multiplier store. These two latter entries are not wanted, but this method saves programme steps, and they will not affect the required calculation. To the socket which controls the gate 473 (Figure 4).—This cancels the programme step if the value in the multiplicand store is in complement, that is, if the true product is less than £50.

*Step 4.*—D10S, 2T.—This divides the value in the multiplicand store by one hundred. If step 3 was operative, the final value will be one hundredth of the product value, that is 00000042127200. The digit "3"

which was entered in the lowest position will be "lost" during the division.

*Step 5.*—SM, 5D, 6D, CB.—This will multiply one hundredth of the product value by three and subtract this from the product value. The plugging of sockets 5D and 6D will enter twenty-nine into the multiplier cycle counter which will therefore set the trigger 238 on the third minor cycle. This is sufficient to allow multiplication by three. The lowest digit of the product value which may have been read into the multiplier store at step 3 will be in the fourth position. No matter what this digit may be, it cannot affect the lowest position of the register in three minor cycles, so that the multiplication will be effected correctly. If step 3 was cancelled, the lowest position of the multiplier store will register zero, and therefore there will be no transfer from the multiplicand store. The value in the product store is now 00004135022400 (£4263–0–0 minus £127–17–9.6).

*Step 6.*—FPA, TMC, ST.—This transfers the product value from the product store to the multiplicand store.

*Step 7.*—D10S, 1T.—This divides the product value held in the multiplicand store by ten, to obtain the true item cost (£413–10–2.64).

*Step 8.*—FMCA, FS4, TP, ST, a socket 490, sockets 488 controlling the gates 487(1) and 487(4), a socket 491 to a T4 pulse, a socket 483 and a socket 484, a T1 pulse to the related socket 481 and a T4 pulse to the related socket 482.—This feeds the item cost from the multiplicand store and the freight charge from store No. 4, adds them and puts the result in the product store. The digit insertion circuits feeds in five at a time corresponding to a tenth of a penny, to round off the charge to consignee to the nearest penny. The digit zeroise circuit prevents the decimals of a penny being read out from the adding unit, so that, at the end of the step, the product store registers 00000415163000.

*Step 9.*—FPB, S5, CB9, TP, ST.—This reads out the charge to consignee which has been punched in card C, subtracts from it the nines complement of the value in the product store, and returns the result to the product store. Since the two values are equal, the product store now contains all nines.

*Step 10.*—ZT, DT.—This adds unity to the value in the product store, and energises the check relay on the occurrence of a carry from the highest denomination. The checking operation on card C is now complete and the remainder of the programme enables the charge to consignee to be calculated for card A.

*Step 11.*—S1, TMR, DT.—This enters the item quantity into the multiplifier store.

*Step 12.*—S2, TMC, ST.—This enters the item unit price into the multiplicand store.

*Step 13.*—As for step 1.

*Step 14.*—As for step 2, except the socket 491 is plugged for a T9 pulse, to enter £50.

*Step 15.*—A for step 3.

*Step 16.*—As for step 4.

*Step 17.*—As for step 5.

*Step 18.*—As for step 8. The charge to consignee is now held in the product store, ready for punching into card A on the next machine cycle.

*Step 19.*—To the socket 460.—This provides an operation complete pulse, without any operation being performed.

*Step 20.*—Produces operation complete pulse as in step 19. At the end of step 20, the calculate trigger 119 is reset.

On the next machine cycle, a new card will be sensed at the first station and the charge to consignee will be punched into card A. The data from card B will be entered for checking and card C will be fed into the stacker.

The same programme operates under starting conditions, when a card has not yet reached the second station. The usual card lever arrangement prevents effective sensing in the absence of a card, so that the programme carries out a dummy check with zero in all the relevant stores.

Although the description relates to checking a sterling value, it will be appreciated that the same procedure applies equally to decimal values.

*Conclusion*

There has been described herein an electronic calculator which may be made to perform addition, subtraction and multiplication on either decimal or sterling quantities.

By simple modifications to the control waveforms, the machine may be adapted to deal with other non-uniform notations such as Indian currency.

Although the storage in the machine described is provided by shifting registers and by capacitor storage units, it will be appreciated that other forms of storage, particularly a magnetic drum, are applicable. In the case of a magnetic drum, it is preferable to retain the last stage of the stores 2 and 3, and the last two stages of the store 1, to enable the circuits to operate as described. The clock pulses are provided by the drum, instead of by a multi-vibrator.

What I claim is:

1. Electronic calculating apparatus in which multi-denominational values are represented by signals, the digits in each denomination of the value being represented by four code component signals, which apparatus comprises separate stores for multiplier representing signals, multiplicand representing signals and product representing signals, halving means for substituting in said multiplier store, for said stored multiplier representing signals, signals representing half the multifier, doubling means for substituting in said multiplicand store, for said store multiplicand representing signals, signals representing double the multiplicand, a detector for detecting when the signals stored in said multiplier store represent an odd value, adding means for adding two value representing sets of signals, complementing means connected to said adding means for complementing value representing signals, means for applying the signals stored in any of said stores to said complementing means, means controlled by said detector for reading out the signals stored in said product and multiplicand stores, a source of pulses, a primary timer controlled by said source for producing a minor cycle of control signals, means for conditioning said complementing means, said adding means and said doubling means operating in more than one scale of notation, means controlled jointly by said source and said primary timer for rendering said conditioning means effective to allow operation in more than one scale of notation in one said minor cycle, and control means for repeating the halving, doubling and adding operations each succeeding minor cycle at least until the value represented by the signals stored in said multiplier register is reduced to zero.

2. Apparatus as claimed in claim 1, having means for conditioning the adding means to operate in more than one radix of notation.

3. Apparatus as claimed in claim 2, having means controlled jointly by the primary timer and by the source of timing pulses, for rendering said conditioning means effective, to allow the adding means to operate with signals representing values in more than one radix of notation during a single minor cycle.

4. Apparatus as claimed in claim 1, having manually settable means for determining the timing in a minor cycle at which a change of scale of notation of the adding means occurs.

5. Apparatus as claimed in claim 4, having means for conditioning the adding means to operate with signals representing decimal values, and with signals representing sterling currency values.

6. Apparatus as claimed in claim 1, having means for conditioning the multiplicand doubling means, to allow it to operate in more than one scale of notation.

7. Apparatus as claimed in claim 1 having two groups of connecting leads for feeding values representing signals into the adding means, and means for selectively reading out signals registered in said multiplier, multiplicand and product stores on to said groups of connecting leads.

8. Apparatus as claimed in claim 7, in which said complementing means are connected in one of said groups of leads to complement the read-out signals, before those signals are fed into said adding means.

9. Apparatus as claimed in claim 1 comprising also a source of shift pulses, input and output gating means for controlling feeding of value-representing signals into said multiplicand store from said adding means and out of said multiplicand store to said adding means, and means for applying to said multiplicand store from said source of shift pulses one more shift pulse than the number necessary to re-enter a value into the multiplicand store, in order to effect division by ten of a decimal value represented by the signals registered in the multiplicand store.

10. Apparatus as claimed in claim 9, having four trigger circuits controlled by said output gates, and means for entering digit-representing signals from said trigger circuit into the adding means, whereby a digit read out from the store at a particular time is one denomination higher than the digit entered into the adding means at the same time, and the number of shifting pulses required to re-enter a value represented by the signals in the store is one greater than the maximum number of denominations registered by the store.

11. Apparatus as claimed in claim 10, having further gating means for entering twice the multiplicand representing signals directly into the adding means, and division control means for controlling both said output gating means and said further gating means.

12. Apparatus as claimed in claim 11 for dividing sterling value representing signals by ten, comprising means for entering twice the units of shillings-representing signals and twice the units of pound-representing signals directly into the adding means, and for preventing read out of the units of pounds-representing signals to said trigger circuits.

13. Apparatus as claimed in claim 12, having means for reading out the signals representing the units digit of the doubled values, carry storage means for storing a carry signal resulting from the doubling operation, and subsequently operable means for reading out said carry signal from the carry storage means.

14. Apparatus as claimed in claim 1, comprising also output gating means for controlling reading out of value-representing signals from said stores to said adding means, input gating means for controlling reading out of signals from said adding means to said stores, a plurality of output lines from said primary timer, one of said output lines having a first potential and the remainder of said output lines having a second potential, means operated by said source of pulses for stepping said primary timer so that each of said output lines in turn assumes the first potential, means for selectively making said input and output gating means effective, manually adjustable connections between said output lines and the means for making said gating means effective, a counter, means for setting said counter to register any one of several predetermined value-representing signals, means for initiating an arithmetic operation requiring a plurality of cycles of the primary timer, means, under joint control of said primary timer and said initiating means, for registering one of said predetermined value-representing signals in said counter and for adding a one-representing signal for each cycle of said primary timer, and means under control of said counter for rendering said initiating means ineffective.

15. Apparatus as claimed in claim 1, comprising also means for punching data into record cards, means for feeding record cards index point by index point, means operative at each index point for comparing signals in said product store representing each digit registered in said product store with the digit represented by the particular index point, and means controlled by the comparing means for operating said punching means.

References Cited in the file of this patent

UNITED STATES PATENTS

| 2,213,565 | Lang | Sept. 3, 1940 |
| 2,419,502 | Baxby | Apr. 22, 1947 |
| 2,544,126 | Baldwin | Mar. 6, 1951 |
| 2,623,115 | Woods-Hill | Dec. 23, 1952 |
| 2,623,171 | Woods-Hill | Dec. 23, 1952 |
| 2,675,177 | Perrin | Apr. 13, 1954 |

OTHER REFERENCES

Berkeley: "How an Electronic Brain Works," Radio-Electronics, July 1951, pages 56, 58, 63 relied on.

"Synthesis of Electronic Computing and Control Circuits," Harvard Staff, Harvard University Press, 1951, pages 158, 167, 168, 173, 184 to 186, 204 to 207, 216 to 230 and 8 to 14.

Sharpless: "Description of Serial Acoustic Binary Edvac," Theory and Techniques for Design of Electronic Digital Computers, volume IV, University of Pennsylvania, June 30, 1948, pages 47–10 to 47–12, and 47–14 (Figure 2) relied on.